United States Patent
Nagasaka

(10) Patent No.: US 6,882,267 B2
(45) Date of Patent: Apr. 19, 2005

(54) DEVICE CONTROLLER

(75) Inventor: Chikao Nagasaka, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 412 days.

(21) Appl. No.: 10/005,315

(22) Filed: Dec. 7, 2001

(65) Prior Publication Data

US 2002/0125988 A1 Sep. 12, 2002

(30) Foreign Application Priority Data

Dec. 8, 2000 (JP) ........................................ 2000-374588

(51) Int. Cl.⁷ .............................................. G05B 23/02
(52) U.S. Cl. ................. 340/3.1; 340/3.7; 340/3.71; 340/5.62; 340/5.1; 180/316; 180/315; 307/10.1
(58) Field of Search ................. 340/3.1, 3.7, 3.71, 340/5.62, 5.1; 701/36, 49; 180/315, 333, 316, 338; 307/9.1, 10.1, 112

(56) References Cited

U.S. PATENT DOCUMENTS 4,503,528 A * 3/1985 Nojiri et al. ................ 367/198
6,448,670 B1 * 9/2002 Onodera et al. ........... 307/10.1

FOREIGN PATENT DOCUMENTS

| JP | 60-41391 | 3/1985 |
| JP | 8-227314 | 9/1996 |
| JP | 2000-125373 | 4/2000 |

* cited by examiner

Primary Examiner—Michael Horabik
Assistant Examiner—Vernal Brown
(74) Attorney, Agent, or Firm—Nixon Peabody LLP

(57) ABSTRACT

A device controller is provided which allows a vehicle occupant to confirm a device to be operated without looking an operation section. When a controller of a microswitch indicates a device such as a window regulator or a sun roof, a control circuit feeds a motion confirmation signal to a corresponding device such as a right-hand front door ECU and a roof ECU. A door glass, a sliding roof or the like then reciprocate slightly (i.e., in an amount that is enough for the vehicle occupant to visually confirm the reciprocation) via a window regulator driving circuit, a sun roof driving circuit or the like. The vehicle occupant can thereby confirm a device to be operated by the operation section without looking an operation section.

6 Claims, 19 Drawing Sheets

FIG.6

RELATIONSHIPS BETWEEN ENERGIZED STATE OF SWITCHES 52 TO 58, 62 TO 84 AND CONTROLLABLE ECU BY CONTROLLER 14

|  | SWITCH 62 | SWITCH 64 | SWITCH 66 | SWITCH 68 | SWITCH 70 | SWITCH 72 |
|---|---|---|---|---|---|---|
| SWITCH 52 | ROOF ECU 210 (SUN ROOF DRIVING CIRCUIT 212) |  |  |  |  |  |
| SWITCH 54 | AUTOMOBILE NAVIGATION SYSTEM ECU 248 | ROOF ECU 210 (RIGHT-HAND FRONT MAP LAMP CONTROL CIRCUIT 10) | RIGHT-HAND FRONT DOOR ECU 92 (WINDOW REGULATOR DRIVING CIRCUIT 114) | RIGHT-HAND FRONT SEAT ECU 166 (SEAT BELT SYSTEM DRIVING CIRCUIT 176) | RIGHT-HAND REAR DOOR ECU 132 (WINDOW REGULATOR DRIVING CIRCUIT 138) | ROOF ECU 210 (RIGHT-HAND REAR MAP LAMP CONTROL CIRCUIT 218) |
| SWITCH 56 | AUDIO ECU 244 | RIGHT-HAND FRONT DOOR ECU 92 (MIRROR DRIVING CIRCUIT 100) |  | RIGHT-HAND FRONT SEAT ECU 166 (SEAT BACK SYSTEM DRIVING CIRCUIT 174) |  |  |
| SWITCH 58 | AIR CONDITIONER ECU 246 | STEERING ECU 156 |  | RIGHT-HAND FRONT SEAT ECU 166 (SEAT CUSHION SYSTEM DRIVING CIRCUIT 172) |  |  |

FIG.6
(CONTINUED)

|  | SWITCH 74 | SWITCH 76 | SWITCH 78 | SWITCH 80 | SWITCH 82 | SWITCH 84 |
|---|---|---|---|---|---|---|
| SWITCH 52 | ROOF ECU 210 (LUGGAGE ROOM LAMP CONTROL CIRCUIT 222) |  |  |  |  |  |
| SWITCH 54 |  | ROOF ECU 210 (LEFT-HAND REAR MAP LAMP CONTROL CIRCUIT 220) |  | LEFT-HAND FRONT SEAT ECU 168 (SEAT BELT SYSTEM DRIVING CIRCUIT 182) |  | ROOF ECU 210 (RIGHT-HAND REAR MAP LAMP CONTROL CIRCUIT 220) |
| SWITCH 56 |  |  | LEFT-HAND REAR DOOR ECU 132 (WINDOW REGULATOR DRIVING CIRCUIT 148) | LEFT-HAND FRONT SEAT ECU 168 (SEAT BACK SYSTEM DRIVING CIRCUIT 180) | LEFT-HAND FRONT DOOR ECU 94 (WINDOW REGULATOR DRIVING CIRCUIT 122) |  |
| SWITCH 58 |  |  |  | LEFT-HAND FRONT SEAT ECU 168 (SEAT CUSHION SYSTEM DRIVING CIRCUIT 178) |  |  |

DEVICE CONTROLLER

BACKGROUND OF THE INVENTION

1. Field of the Invention

The present invention relates to a device controller which controls various devices mounted in a vehicle, such as an audio system, an air conditioner, a window regulator, and electrically driven mirrors. More particularly, the present invention relates to a device controller suitable for a structure in which multiple devices are controlled using a single controller.

2. Description of the Related Art

In recent years, various devices which adjust the angle or the position of seat by reclining or sliding respectively, or the angle of reflective surfaces of door mirrors as well as the air conditioner and the audio system are operated electrically.

It is difficult, however, to provide controllers for each of these devices in a narrow space such as a vehicle compartment. A single controller which can control various devices has therefore been considered. An example of such controller is disclosed in the publication of Japanese Patent Application Laid-Open (JP-A) No. 8-227314.

The controller disclosed in JP-A 8-227314 includes a dial and is disposed between driver's seat and a passenger seat. By turning a dial knob to a label on which is written the name of the device desired to be operated (e.g., an electrically driven mirror), the device and the controller become connected, whereby the device becomes able to be controlled by the controller.

However, in the above structure in which a vehicle occupant designates a device to be operated by turning the dial, he or she can confirm whether the device has become controllable only by looking the label of the device name or the like provided on or near the dial.

To solve this problem, an indicator may be provided at each device and may be lighting to indicate that the device becomes operable. However, it is difficult to provide an indicator on some of the devices such as the electrically driven mirror. Further, even if the indicator can be provided on devices, the indicator is expensive.

SUMMARY OF THE INVENTION

In view of the aforementioned, it is an object of the present invention to provide a device controller which allows a vehicle occupant to confirm a device to be operated without looking an operation section.

A device controller according to a first aspect of the present invention comprises an operation section which can send an operation signal to a device; and a controlling section for notifying, at a point in time at which the device becomes able to receive the operation signal from the operation section, that the device has become able to receive the operation signal from the operation section, by actuating a function that the device has for achieving an original object to thereby change a physical state of the device to a state that is different from the present state of the device.

A device controller according to a second aspect of the present invention comprises an operation section which can send an operation signal to a device which is disposed at a spaced position therefrom; and a controlling section for changing a physical state of the device to a state that is different from the present state of the device and for returning, after the changing, the physical state of the device to an initial state of the device, by actuating a function that the device has for achieving an original object, at a point in time at which the controlling section becomes able to receive the operation signal from the operation section.

In the thus structured device controller, upon receiving the operation signal from the operation section, the controlling section controls the device in accordance with the operation signal.

At a time at which the controlling section becomes able to receive the operation signal from the operation section, the controlling section changes the physical state of the device to the state that is different from the present state of the device once by actuating the function in which the device has for achieving the original object. Further, preferably, the state of the device is returned to the initial state (namely, a state before the changing) of the device. In this manner, the controlling section notifies the vehicle occupant this receivable condition. Accordingly, the vehicle occupant can confirm that the device is able to be operated by the operation section by confirming change of this state visually, auditorily, or the like. Accordingly, in this arrangement, it is not necessary that means for confirming such as an indicator is provided at the device.

As used herein, the term "a function in which the device has for achieving an original object" means a function in which the device originally has, such as pivoting of a mirror for changing a reflection angle, air blasting of the air conditioner, and sound transmission of the audio system, and does not mean a function especially provided for confirmation.

As used herein, the term "a physical state" means a state in which a person can recognize by various senses, namely, seeing, hearing, touching, and the like. For example, the physical state of a light source such as a bulb is flashing of light or increasing or decreasing of light intensity. The physical state of an audio system is increasing or decreasing of sound volume or turning on/off the switch. The physical state of a device which performs a particular motion such as movement or pivoting is a reciprocation or a pivotal reciprocation in a predetermined amount.

The above change in physical state and returning to an initial state is not limited to carried out one time, may be carried out many times.

A device controller according to a third aspect of the present invention is characterized in that, in the first or second aspect, the device includes a driving section which displaces a driven part on the basis of the operation signal from the operation section, and at the point in time at which the controlling section becomes able to receive the operation signal from the operation section, the controlling section drives the driving section to displace the driven part in a predetermined direction by a predetermined amount, and, immediately after the driven part is displaced in the predetermined amount, drives the driving section to displace the driven part in a direction opposite to the predetermined direction by the predetermined amount.

According to the above device controller, the device includes the driven part which is moved by the driving section. The driven part can properly be moved by, for example, the driving section which is driven by the control section or other controller according to the operation signal sent from the operation section.

When the controlling section becomes able to receive the operation signal from the operation section, first, the controlling section drives the driving section to displace the driven part toward a predetermined direction in a predetermined amount. Immediately after this displacement takes place, the driven part is displaced in the reverse direction in the above predetermined amount (i.e., the same amount as that of above displacement). As a result, the driven part returns to the initial state (i.e., the state before the displacement occurs).

In the device controller of the present invention, the driven part of device reciprocates as described above when corresponding device becomes controllable by the operation signal from the operation section. This reciprocation allows the vehicle occupant to visually confirm whether the device has become controllable.

Further, the driving section drives the driven part to displace appropriately as well as to reciprocate. The driving section therefore requires no additional function for confirming whether or not it has become controllable by the operation section. As a result, the structure can be simplified and the cost can be reduced compared to a case in which an extra means for confirming such as an indicator is provided at the device.

A device controller according to a fourth aspect of the present invention is characterized in that, in the first, second, or third aspect, the operation section includes an operation section main body provided so as to be displaceable within a predetermined range in a vehicle compartment and detecting sections, with each detecting section being connected to the controlling section and detecting the operation section main body at different positions within the predetermined range, the device is mounted in the vehicle, and the operation section can send the operation signal to the device when the operation section main body is in a position corresponding to the device within the predetermined range.

According to the thus structured device controller, the operation section main body is provided so as to be displaced in a predetermined range in a vehicle compartment. When the operation section main body is displaced within the predetermined range to reach a position corresponding to a device mounted in the vehicle, the device becomes operable by the operation section.

When the detecting section detects that the operation section main body has reached a position corresponding to the device mounted in the vehicle and sends a detecting signal to the control section, the physical state of the corresponding device is changed from the present state to a different state and then returned to the initial state (namely, the state before changing). Accordingly, the device controller of the present invention allows the vehicle occupant to confirm whether or not the corresponding device has become controllable by confirming the change in physical state of the device once without looking the operation section main body as well as to confirm which device has become controllable by looking the operation section main body.

As used herein, the term "displacement of the operation section main body within the predetermined range" can mean a sliding movement in the vehicle longitudinal direction, vehicle transverse direction, vehicle vertical direction, or the like, or an axial rotation with a predetermined direction being as an axial direction.

A device controller according to a fifth aspect of the present invention is characterized in that, in the first, second, third, or fourth aspect, the operation section includes an operation section main body provided so as to be displaceable within a predetermined range in a vehicle compartment and detecting sections, with each detecting section being connected to the controlling section and detecting the operation section main body at different positions thereof within the predetermined range, the device is mounted in the vehicle, and when one detecting section detects the operation section main body, the operation section can send the operation signal to the device that corresponds to the detecting section, and a direction indicated by the operation section main body substantially corresponds to a position of the device corresponding to the detecting section.

BRIEF DESCRIPTION OF THE DRAWINGS

FIG. 6 is a table showing relationships between detected states detected by a detecting section and devices which are controllable by a device controller;

FIG. 13A illustrating a sliding roof in its fully closed state, and

FIG. 13B illustrating the sliding roof in its slightly slit state;

FIG. 14A illustrating the sliding roof in its fully opened state, and

FIG. 14B illustrating the sliding roof in its slightly slit state;

FIG. 15A illustrating a mirror body in its normal state, and

FIG. 15B illustrating a mirror body in its slightly slit state;

FIG. 16A illustrating a door glass in its fully closed state, and

FIG. 16B illustrating the door glass which is moved slightly down; and

FIG. 17A illustrating a door glass in its fully opened state, and

FIG. 17B illustrating the door glass which is moved slightly up.

DESCRIPTION OF THE PREFERRED EMBODIMENTS

Figure 4:
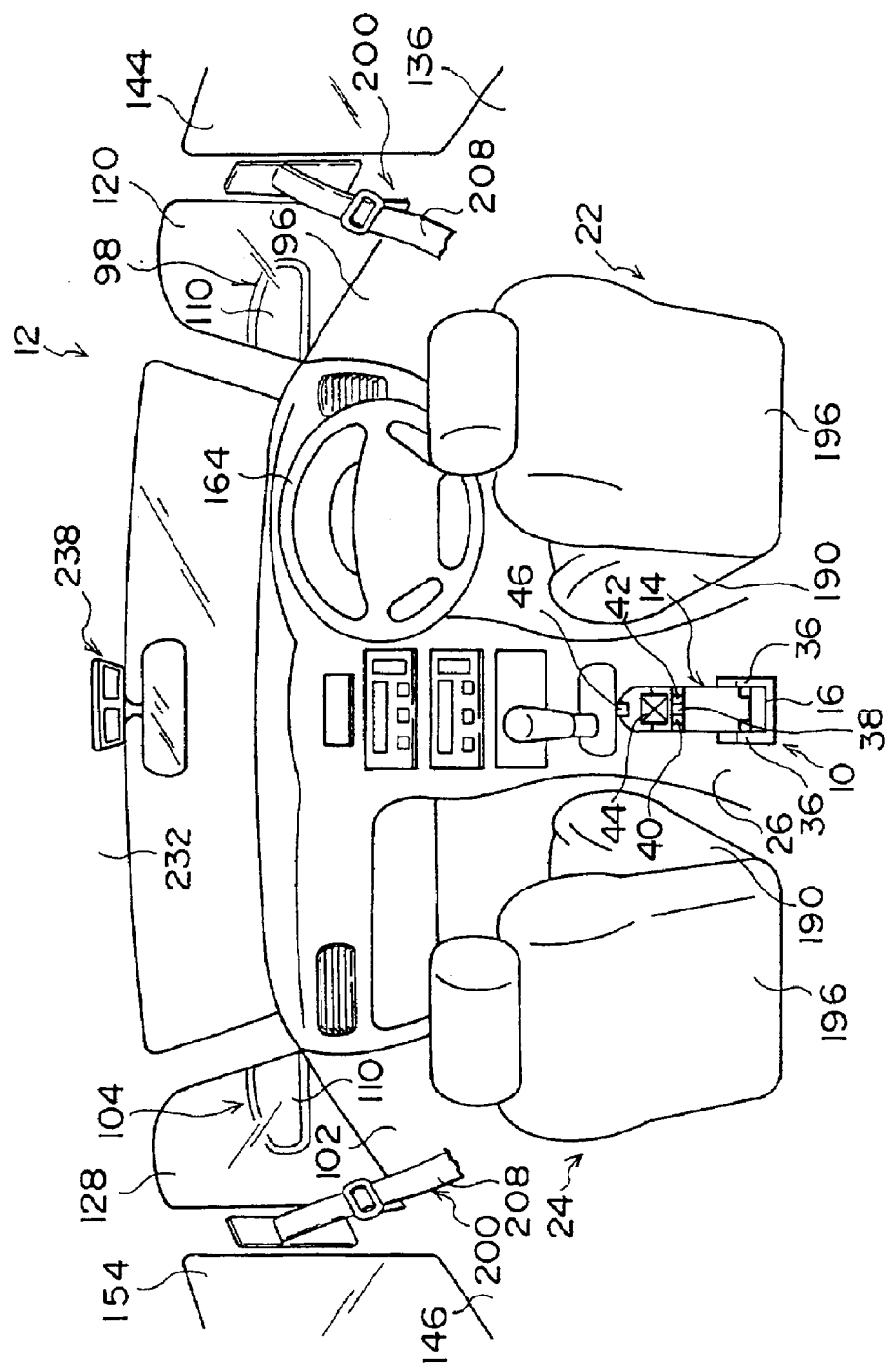
FIG. 4 illustrates the interior of a vehicle compartment equipped with a controller relating to an embodiment of the present invention.

FIG. 4 is a perspective view of the interior of a vehicle 12 equipped with a multi-access switch 10 as a device controller relating to an embodiment of the present invention. A controller 14, serving as an operation section of the multi-access switch 10, is shown in an enlarged perspective view in FIG. 1.

Figure 3:
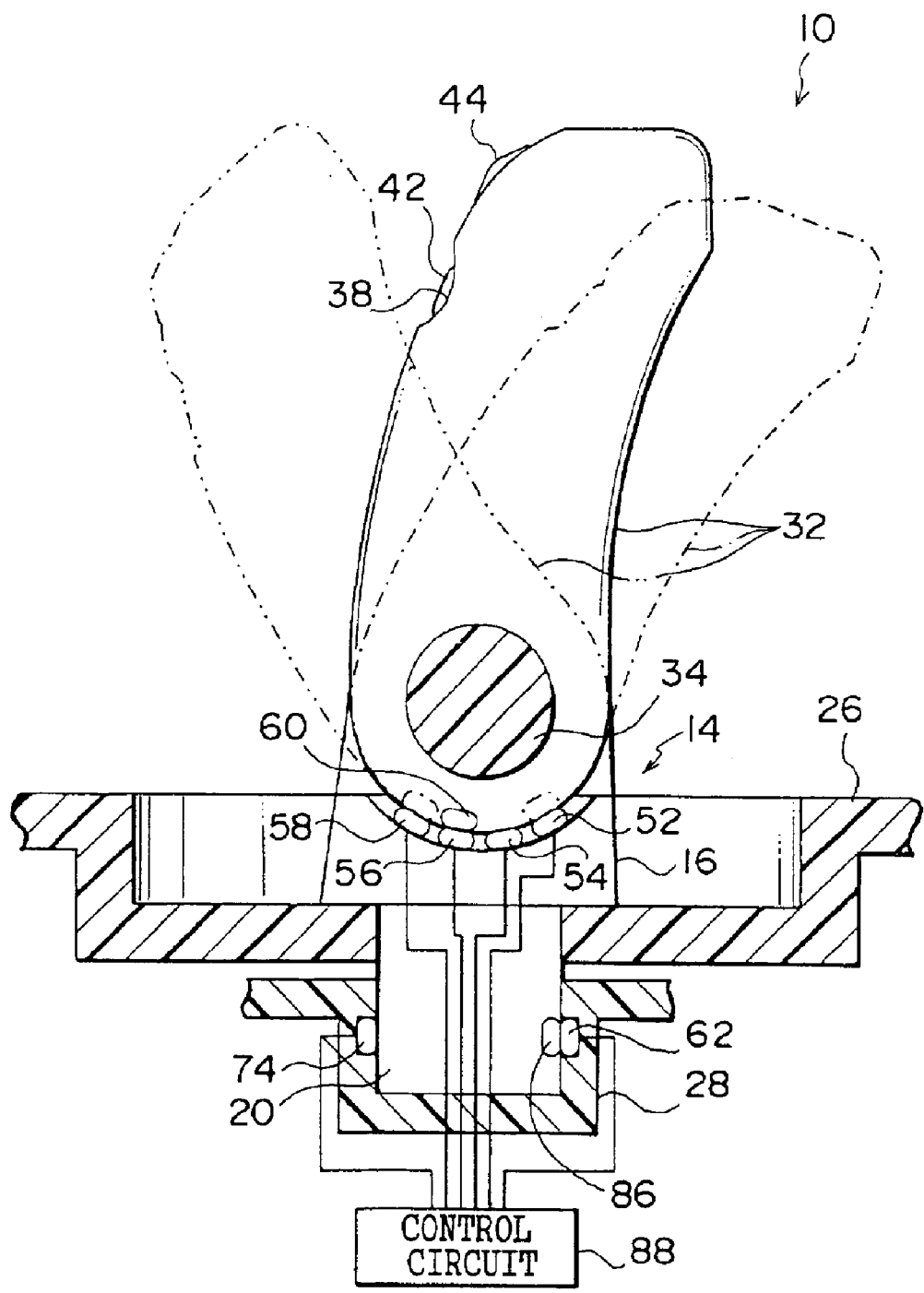
FIG. 3 is a side view schematically illustrating the operation section.

As shown in the drawings, the controller 14 includes a rotating section 16 which constitutes an operation section main body. As shown in FIG. 3, the rotating section 16 has a shaft 20 disposed such that the axial direction thereof runs substantially vertically. The shaft 20 penetrates a console 26 which is provided between a driver's seat 22 and a passenger seat 24. The shaft 20 is supported by a support 28 which is provided at a lower side of the console 26. The shaft 20 is rotatable about the axis thereof, the axis extending substantially vertically.

Figure 1:
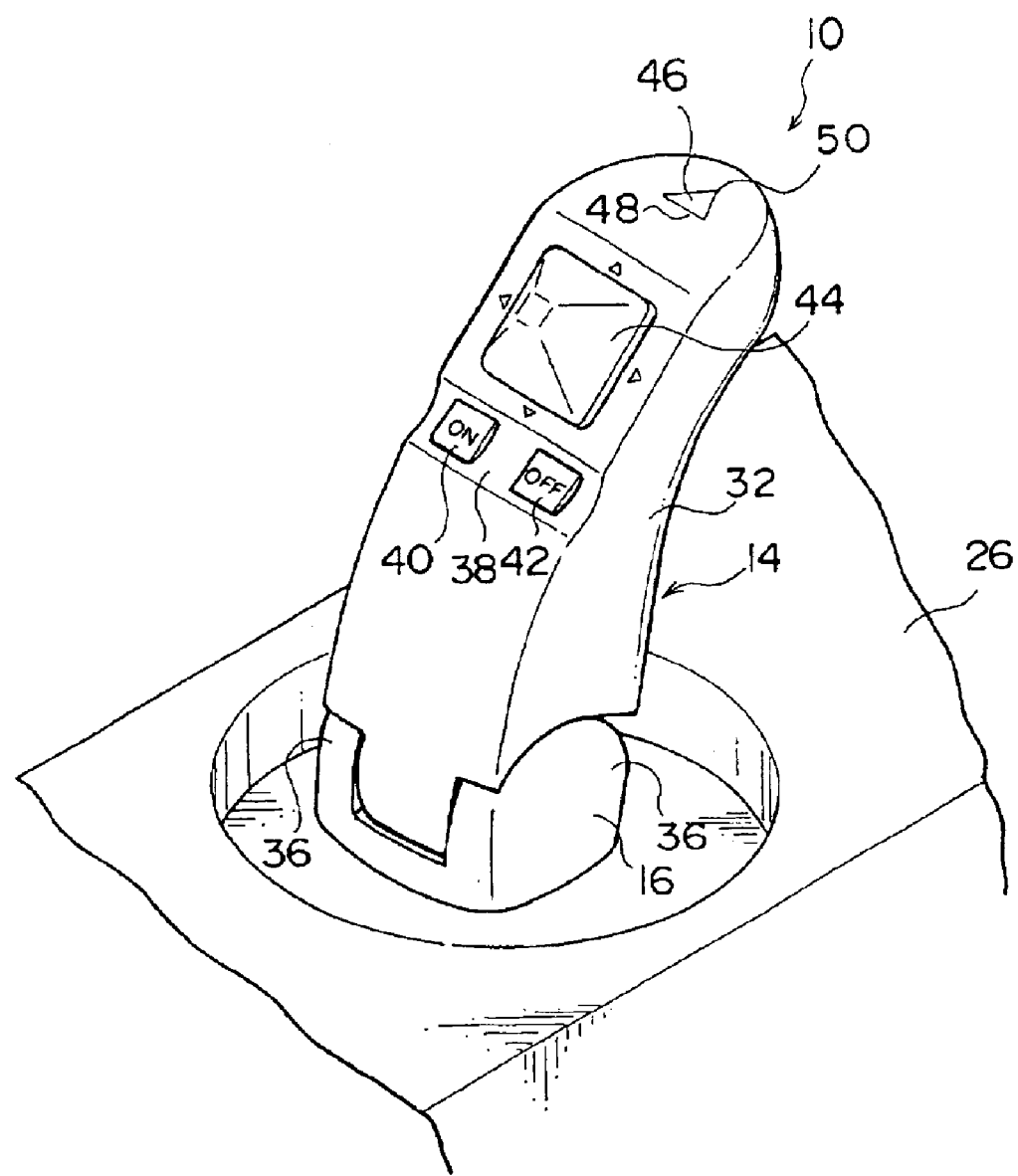
FIG. 1 is a perspective view illustrating an operation section of a device controller relating to an embodiment of the present invention.

As shown in FIGS. 1 and 3, the rotating section 16 has a grip 32 which, together with the rotating section 16, constitutes the operation section main body. The shaft 34 is provided at the side opposite to the side at which the shaft 20 of the rotating section 16 is provided. The overall shape of the grip 32 is a square bar, whose volume allows a vehicle occupant of the vehicle 12 to grip it. As shown in FIG. 3, the shaft 34 is disposed at a longitudinal lower end of the grip 32 with the axial direction thereof extending along the width direction of the grip 32. The grip 32 is supported by a pair of side walls 36 formed on the rotating section 16 and is pivotable about the shaft 34.

A concave portion 38 is formed at the side of another end in the longitudinal direction of the grip 32. A pair of switches 40, 42 are provided at the inside (bottom) of the concave portion 38. The switches 40, 42 are electrically connected to a control circuit 88 shown in FIGS. 2 and 3 via electric connecting parts (not shown) such as circuit substrates and wires disposed inside of the grip 32, the rotating section 16, and the support 18.

A key 44 is provided at a position further toward the other end of the grip 32 than the convex portion 38. The overall shape of the key 44 is a substantially quadrangular pyramid shape. An upper half of the key 44 in the height direction thereof is exposed from the surface of the grip 32. The key 44 is supported at the inside of the grip 32 and is pivotable at a predetermined angle in the longitudinal and transverse directions of the grip 32. When any one of four sloped flats of the quadrangular pyramid shaped key 44 is pressed, the key 44 tilts toward a pressed direction. The key 44 also is an electric switch. When any one of the four sloped flats described above is pressed, an electric wire (not shown) is conducted to a portion corresponding to the pressed sloped flat (i.e., the key 44 basically has the same structure as that of a so-called joy stick).

A triangular mark 46 having an apex angle 50 and a base 48 is provided at an upper surface of the grip 32. The apex angle 50 indicates the direction of the grip 32.

As shown in FIG. 3, a plurality of (four in the present embodiment) proximity switches 52, 54, 56, and 58 are arranged near an outer periphery of the shaft in the rotating section 16. Hereinafter, the proximity switches 52, 54, 56, and 58 are often referred to as the switches 52 to 58 for convenience, and the same applies to other similar members. When a magnetic body, such as a metal, approaches within a predetermined range of one of the corresponding switches 52 to 58, the corresponding switch may be energized. The switches 52 to 58 are arranged substantially equidistantly from the rotation center of the shaft along the radial direction thereof and at predetermined intervals along the periphery of the shaft along the rotation direction thereof.

A movable body 60 is provided to correspond to the switches 52 to 58. In a case in which the switches 52 to 58 detect whether the magnetic body moves closer or away from the switches, the movable body 60 is made from a magnetic body such as metal. The movable body 60 is incorporated in and rotates integrally with the shaft 20 (i.e., rotates integrally with the grip 32 about the shaft). When the movable body 60 most closely faces one of the switches 52 to 58 along the rotating radial direction of the shaft, the faced switch detects the movable body 60.

Figure 2:
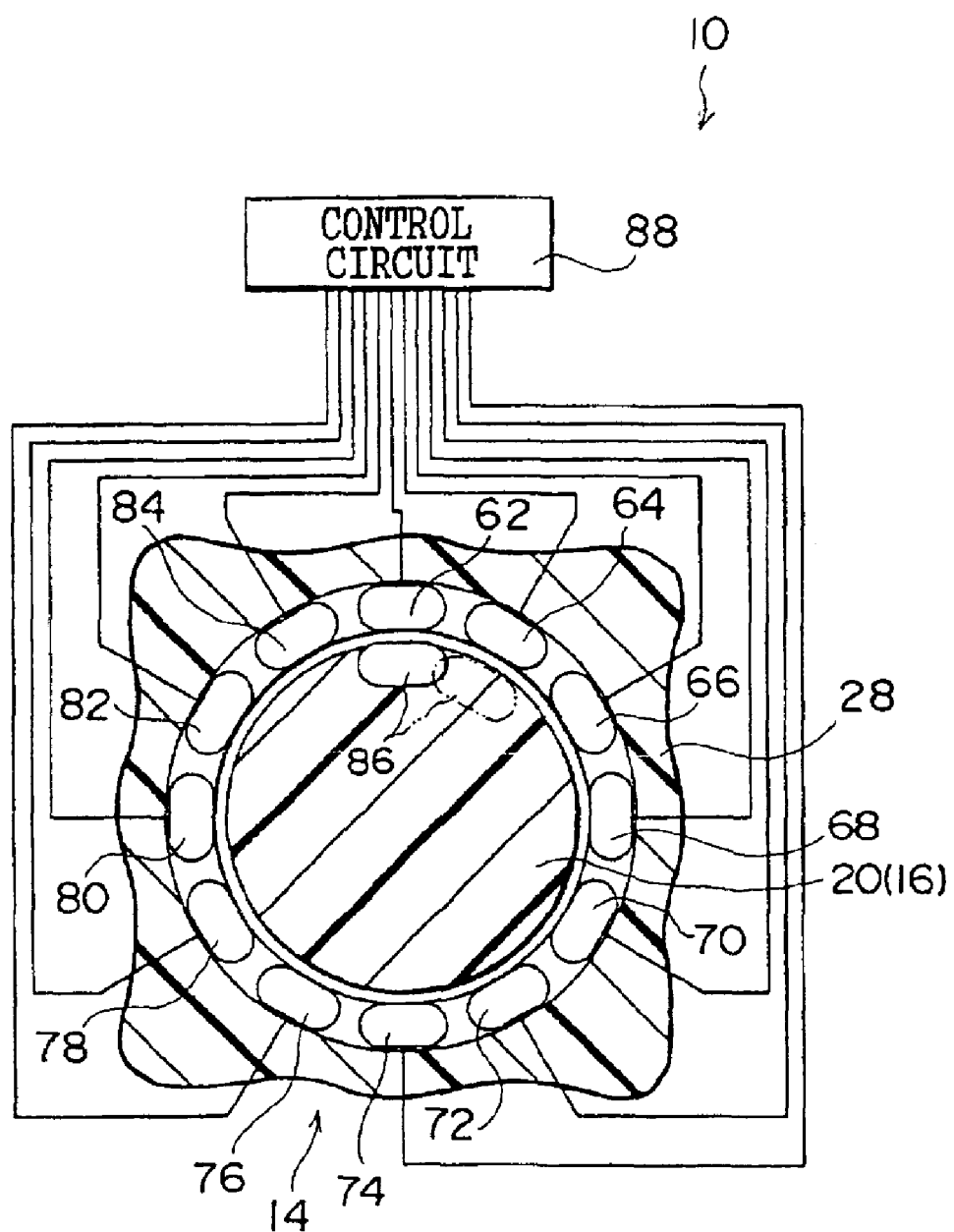
FIG. 2 is a plan view schematically illustrating the operation section.

As shown in FIG. 2, a plurality of (twelve in the present embodiment) proximity switches 62, 64, 66, 68, 70, 72, 74, 76, 78, 80, 82 and 84 are arranged near an outer periphery of the rotating section 16 in the support 28. The plurality of switches constitute the rotational position detecting section (the detecting section). Similarly to the switches 52 to 58, the switches 62 to 84 are structured such that, when a magnetic body, such as a metal, approaches within a predetermined range of one of the corresponding switches 62 to 84, the corresponding switch may be energized. The switches 62 to 84 are arranged substantially equidistantly from the rotation center of the rotating section 16 toward the radial direction thereof and at predetermined intervals along the periphery of the rotating section 16 along the rotation direction thereof.

A movable body 86 is provided at the rotating section 16 to correspond to the switches 62 to 84. In a case in which the switches 62 to 84 detect whether the magnetic body moves closer or away from the switches, the movable body 86 is made from a magnetic body such as metal. The movable body 86 is incorporated in and rotates integrally with the rotating section 16. When the movable body 86 most closely faces one of the switches 62 to 84 along the rotating radial direction of the rotating section 16, the faced switch detects the movable body 86.

Figure 5:
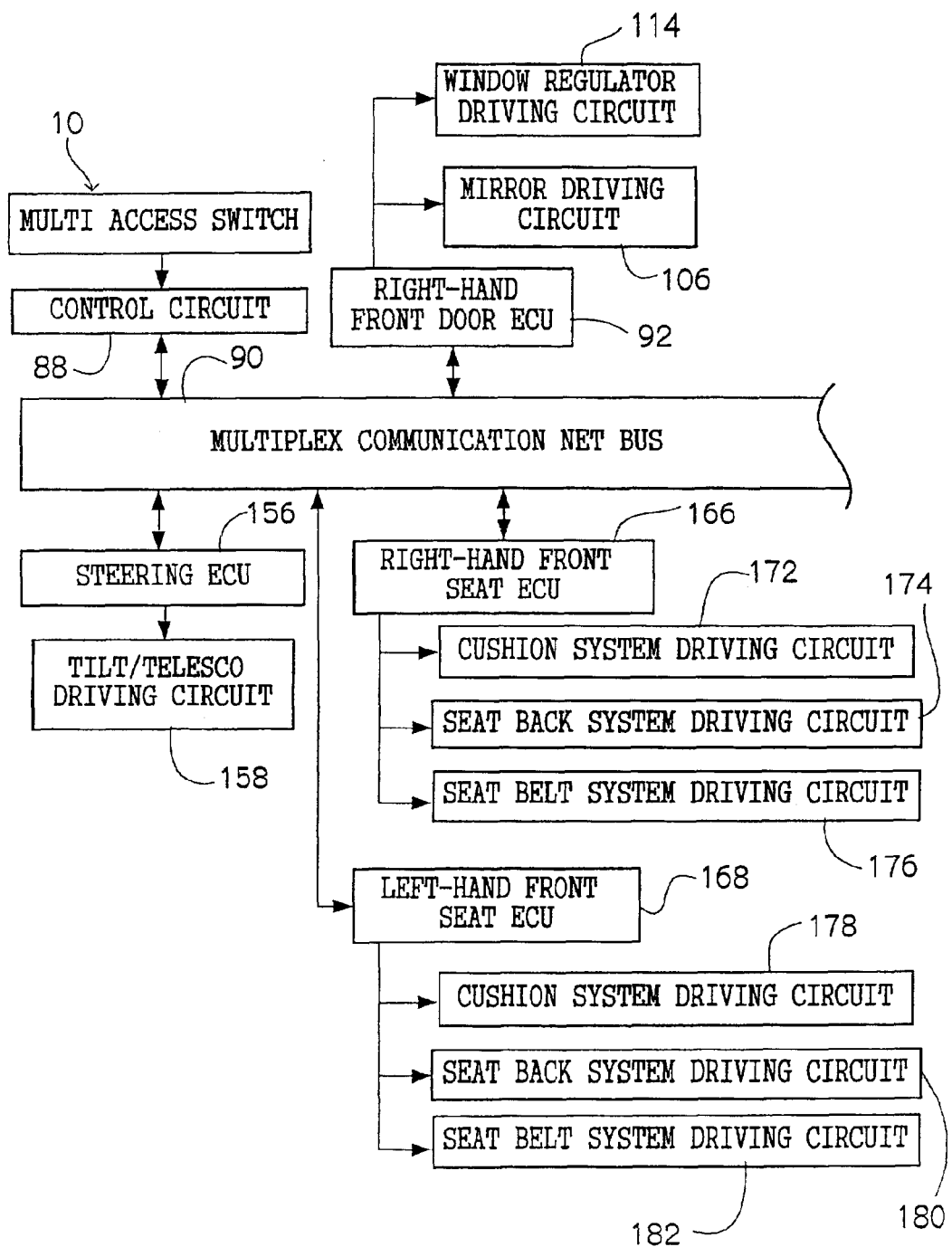
FIG. 5 is a block diagram showing relationships between a device controller relating to an embodiment of the present invention and each device.
Figure 5:
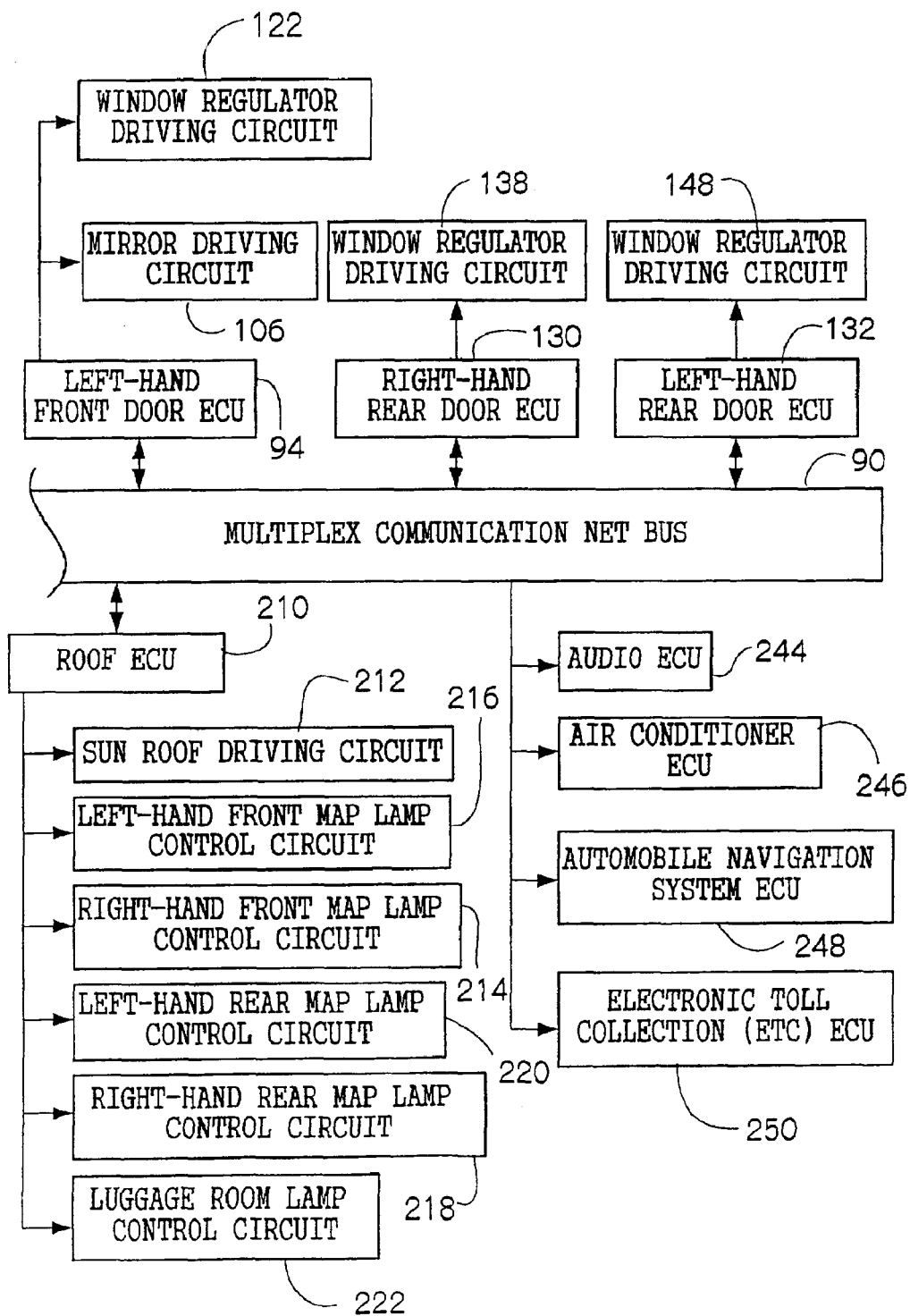

As shown in FIGS. 2 and 3, these switches 52 to 58 and 62 to 84 are electrically connected to a control circuit 88 which functions as a control section. The control circuit 88 detects the turned position (orientation) of the grip 32 about the rotating section 16 and the turned position about the shaft 20 on the basis of electric signal from the switches 52 to 58 and 62 to 84. As shown in FIG. 5, the control circuit 88 is connected to a multiplex communication net bus 90.

As shown in FIG. 5, the control circuit 88 is electrically connected to a right-hand front door ECU 92 and a left-hand front door ECU 94 via the bus 90. The right-hand front door ECU 92 is electrically connected to a mirror driving circuit 100 which corresponds to a door mirror 98 (see FIG. 4) provided at a right-hand front door panel 96 of the vehicle 12. The left-hand front door ECU 94 is electrically connected to the mirror driving circuit 106 which corresponds to a door mirror 104 (see FIG. 4) provided at a left-hand front door panel 102 of the vehicle 12. The mirror driving circuit 100 is electrically connected to a mirror driving motor 108 serving as a driving section as shown in FIG. 7.

Figure 7:
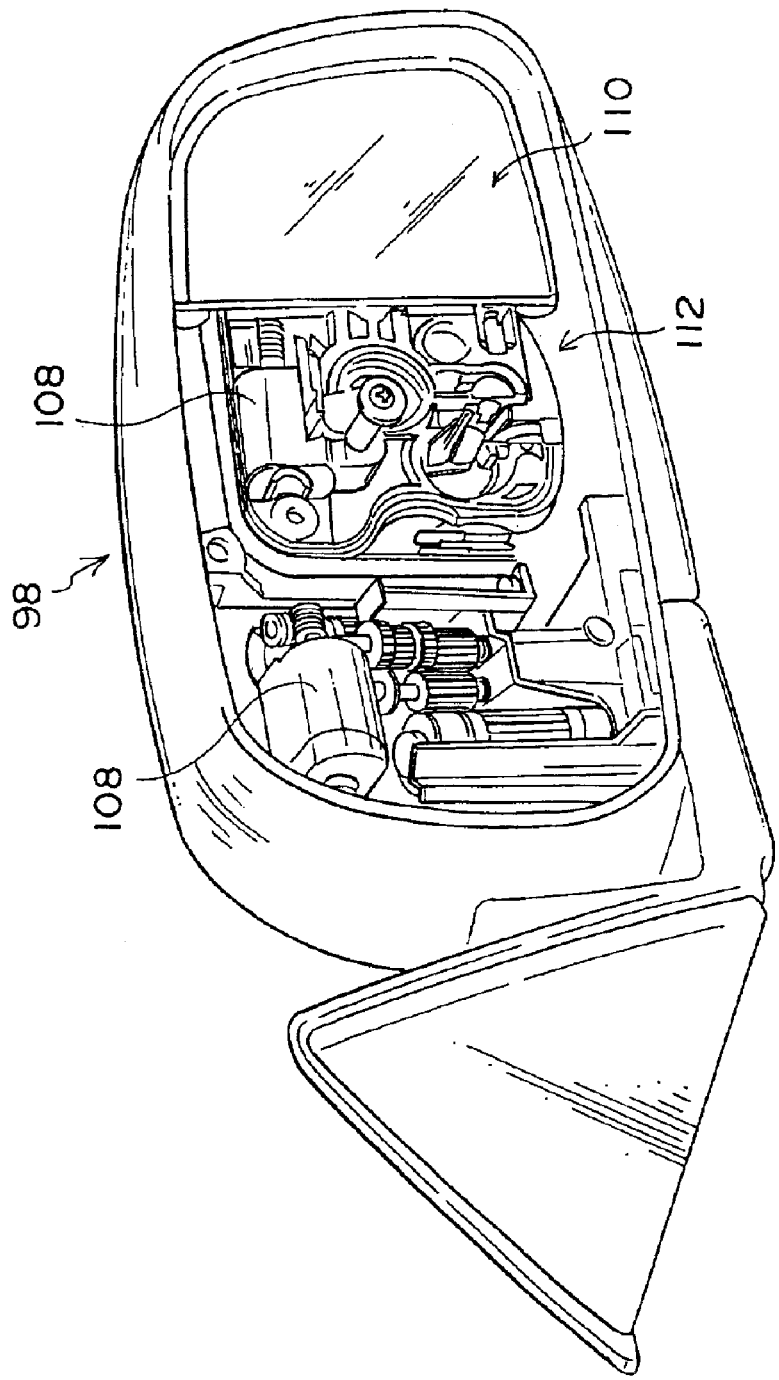
FIG. 7 is a perspective view schematically illustrating a door mirror.

As shown in FIG. 7, the mirror driving motor 108 is mechanically connected to a support 112. The support 112 supports a mirror body 110, which is a driven part, from the back. When the mirror driving motor 108 is energized, the mirror body 110 is pivoted to change the angle of the reflective surface. Although not illustrated in detail, a mirror driving circuit 106 is also electrically connected to the mirror driving motor 108 provided at the door mirror 104. When the mirror driving motor 108 is energized, the mirror body 110 is pivoted to change the angle of the reflective surface.

As shown in FIG. 5, the right-hand door ECU 92 is electrically connected to a window regulator driving circuit 114 which corresponds to the door panel 96. The window regulator driving circuit 114 is electrically connected to a driving motor 118. The driving motor 118 is a driving section of a window regulator 116 shown in FIG. 8. When the window regulator driving circuit 114 energizes the driving motor 118, a door glass 120 moves up and down. The door glass 120, which is a driven part, is provided at the door panel 96. Similarly, the left-hand door ECU 94 is electrically connected to a window regulator driving circuit 122 which corresponds to the door panel 102.

The window regulator driving circuit 122 is electrically connected to a driving motor 126. The driving motor 126 is a driving section of a window regulator 124 shown in FIG. 8. When the window regulator driving circuit 122 energizes the driving motor 126, a door glass 128 moves up and down. The door glass 128, which is a driven part, is provided at the door panel 102.

As shown in FIG. 5, the control circuit 88 is also electrically connected to a right-hand rear door ECU 130 and a left-hand rear door ECU 132 via the bus 90. As shown in FIG. 5, the right-hand rear door ECU 130 is electrically connected to a window regulator driving circuit 138 which corresponds to a right-hand rear door panel 136.

Figure 8:
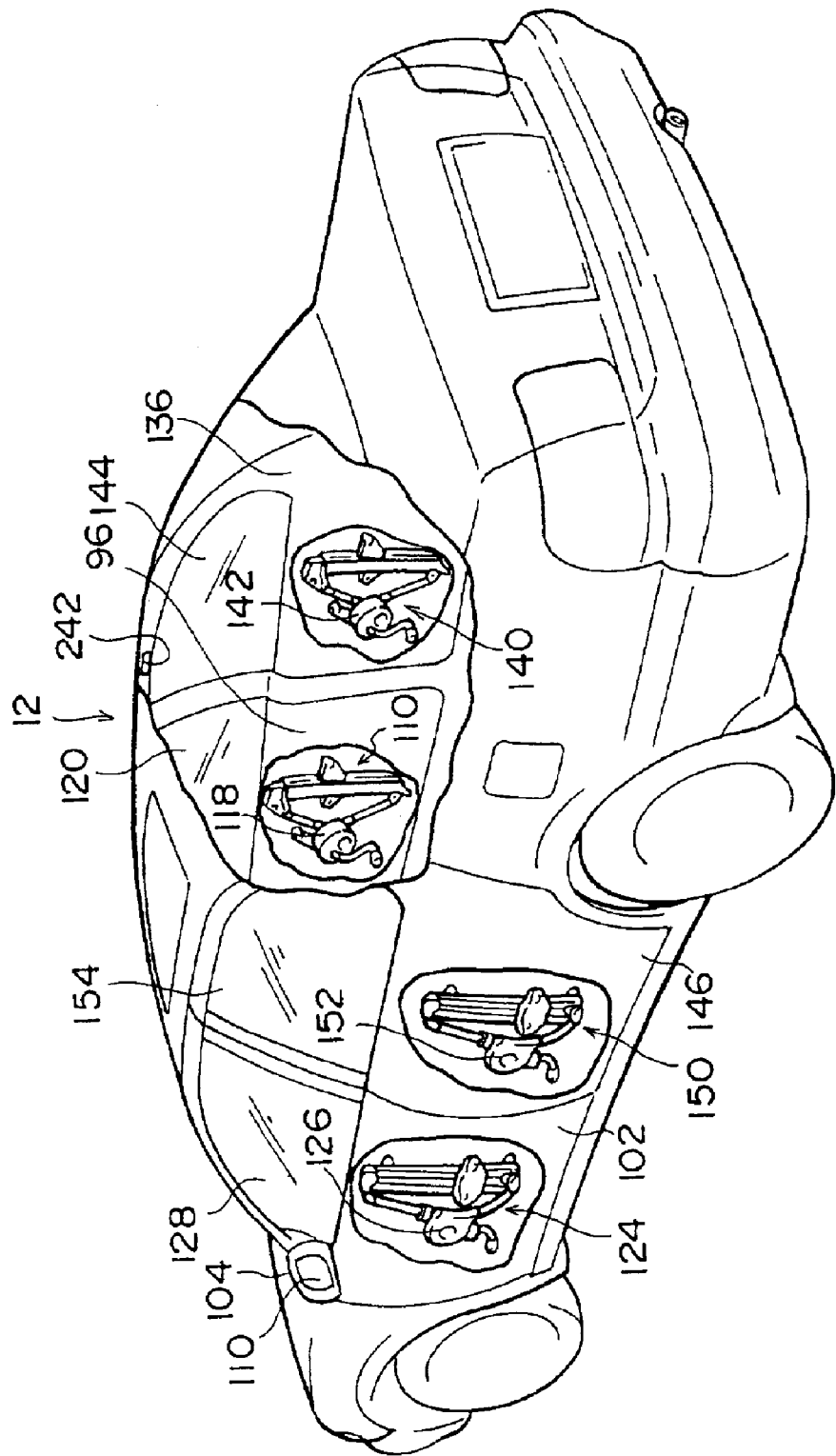
FIG. 8 is a perspective view schematically illustrating a window regulator.
Figure 9:
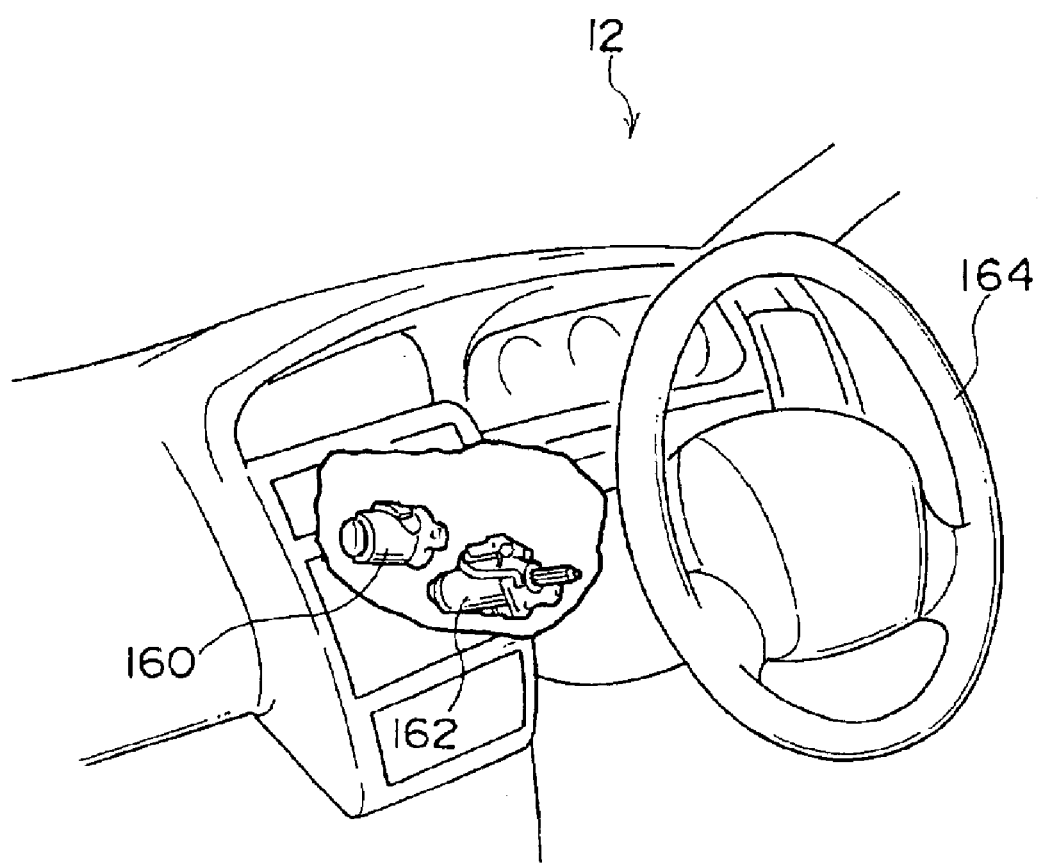
FIG. 9 is a perspective view schematically illustrating a tilt/telesco mechanism of a steering wheel.

The window regulator driving circuit 138 is electrically connected to a driving motor 142 (shown in FIG. 8). The driving motor 142 is a driving section of a window regulator 140. When the window regulator driving circuit 138 energizes the driving motor 142, a door glass 144 moves up and down. The door glass 144, which is a driven part, is provided at the door panel 136.

Similarly, the left-hand rear door ECU 132 is electrically connected to a window regulator driving circuit 148 which corresponds to a left-hand rear door panel 146.

The window regulator driving circuit 148 is electrically connected to a driving motor 152 (shown in FIG. 8). The driving motor 152 is a driving section of a window regulator 150. When the window regulator driving circuit 148 energizes the driving motor 152, a door glass 154 moves up and down. The door glass 154, which is a driven part, is provided at the door panel 146.

As shown in FIG. 5, the control circuit 88 is also electrically connected to a steering ECU 156 via the bus 90. The steering ECU 156 is electrically connected to a tilt/telesco driving circuit 158. The tilt/telesco driving circuit 158 is connected to a tilt adjusting motor 160 and telesco adjusting motor 162 to control the same. The tilt adjusting motor 160 drives the steering wheel 164 to pivot about the axis thereof to change the axial direction of the steering wheel 164. The telesco adjusting motor 162 moves the steering wheel 164 along the axial direction thereof.

As shown in FIG. 5, the control circuit 88 is also electrically connected to a right-hand front seat ECU 166 and a left-hand front seat ECU 168 via the bus 90. The right-hand front seat ECU 166 is connected to a cushion system driving circuit 170, seat back system driving circuit 174, and a seat belt system driving circuit 176, which are provided corresponding to the driver's seat 22 (see FIG. 4). The left-hand front seat ECU 168 is connected to a cushion system driving circuit 178, seat back system driving circuit 180, and a seat belt system driving circuit 182, which are provided corresponding to the passenger seat 24 (see FIG. 4).

Figure 10:
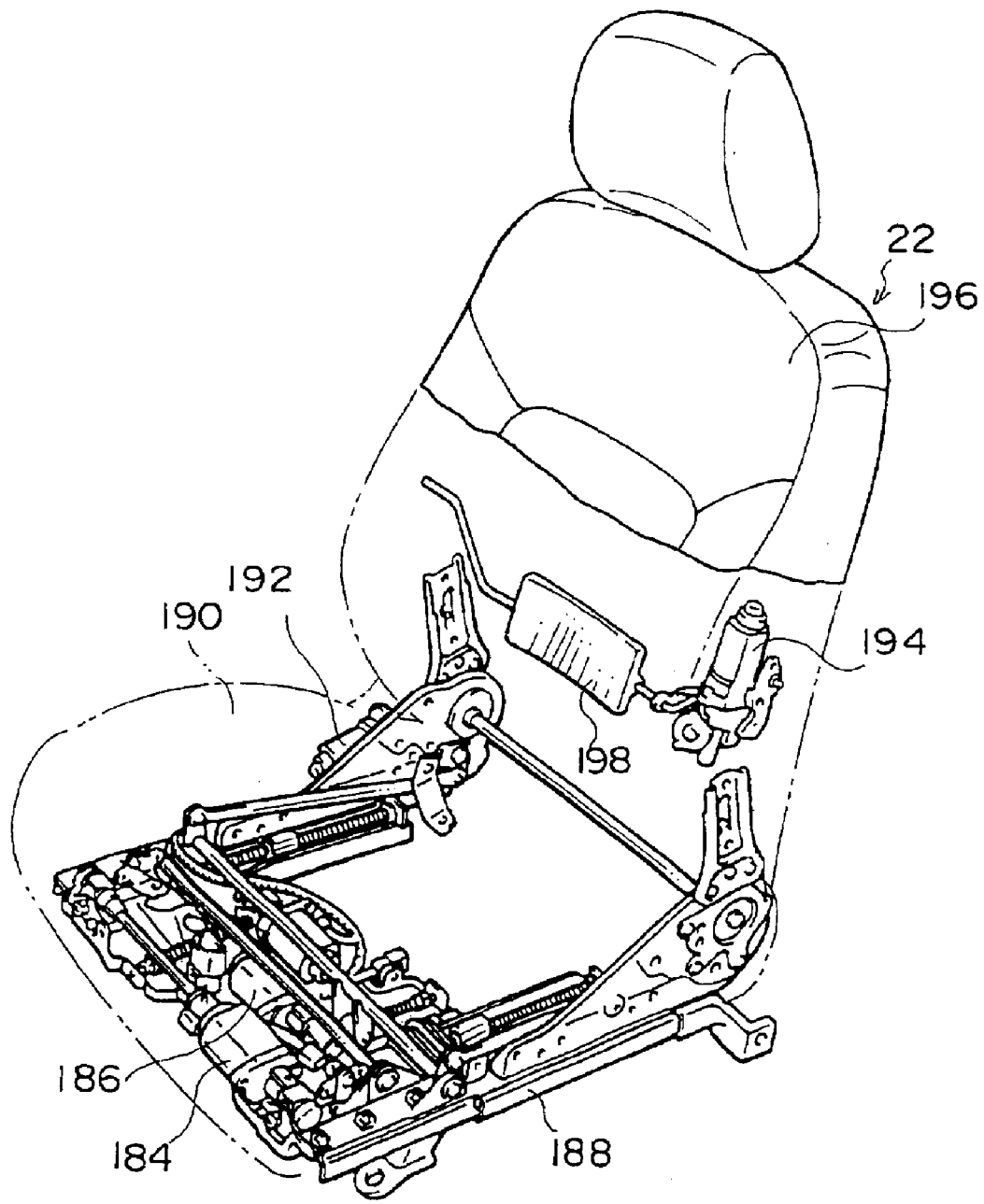
FIG. 10 is a perspective view schematically illustrating each mechanism of a seat such as a slide, vertical, reclining and lumber.

The cushion system driving circuit 170 is connected to a sliding motor 184 and a vertical motor 186 (shown in FIG. 10) to control the same. The sliding motor 184 moves the driver's seat 22 in the longitudinal direction of the vehicle 12 along guide rails 188 attached to the vehicle 12. The vertical motor 186 moves a seat cushion 190 forming a sitting surface of the driver's seat 22 substantially vertically.

The seat back system driving circuit 174 is connected to a reclining motor 192 and a lumber motor 194 to control the same. A seat back 196 forms a backrest of the driver's seat 22. The reclining motor 192 drives the seat back 196 to be pivoted about an axis which is disposed at a lower end portion of the seat back 196 and extends in the vehicle transverse direction. The lumber motor 194 moves the panel 198 in the substantial vehicle longitudinal direction. The panel 198 is disposed such that the thickness direction thereof runs along the vehicle longitudinal direction.

Figure 11:
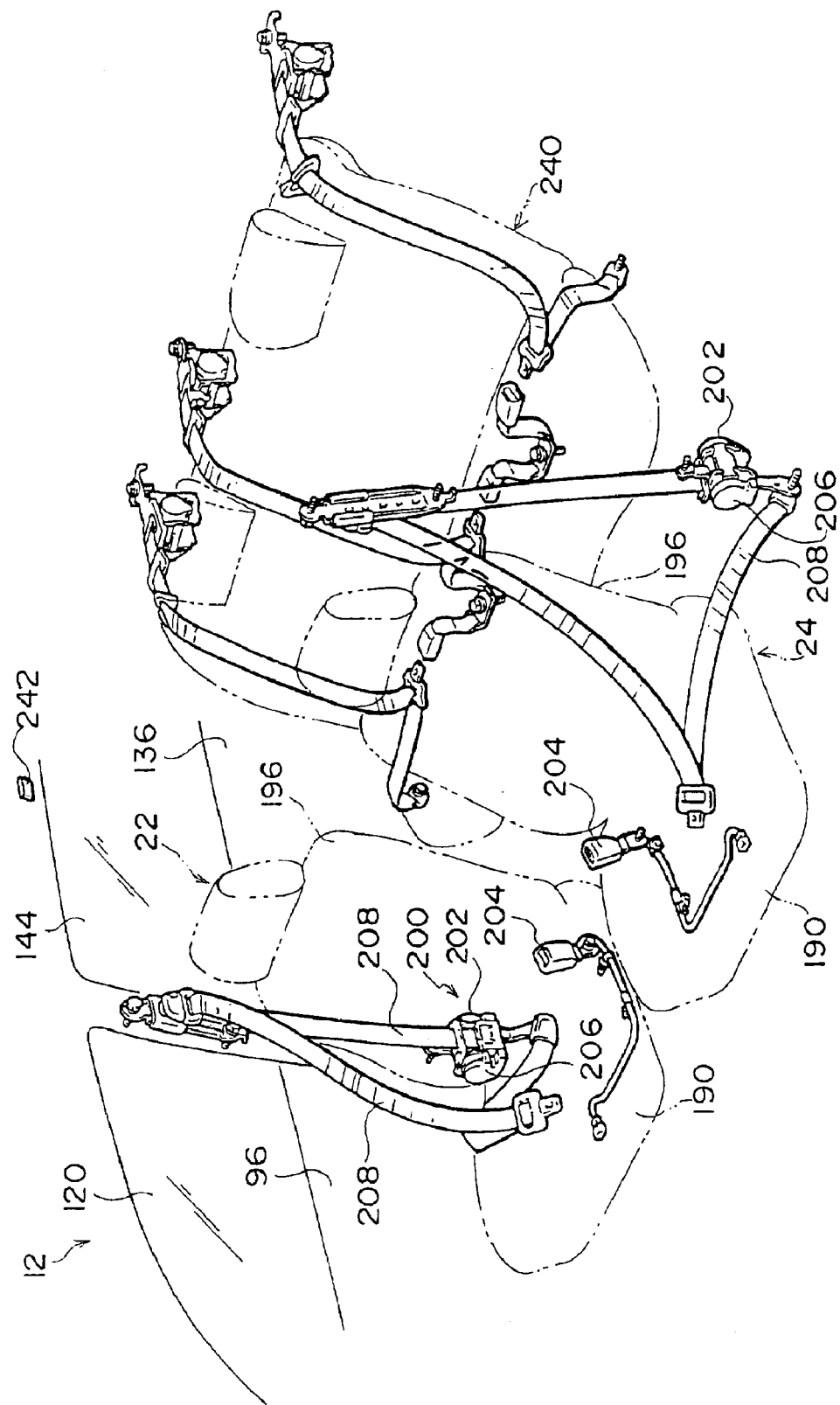
FIG. 11 is a perspective view schematically illustrating a seat belt device.

The seat belt system driving circuit 176 is electrically connected to an adjuster motor 206 provided corresponding to a retractor 202 or to a buckle device 204 (the retractor 202 in the present embodiment) which form a seat belt device 200 of the driver's seat 22 as shown in FIG. 11. The adjuster motor 206 is mechanically connected to a spool of the retractor 202 to rotate the spool. One end of a webbing belt 208 shown in FIG. 11 is anchored to the spool. When the adjuster motor 206 rotates the spool of the retractor 202 rotate, the tension of the webbing belt can be adjusted.

The cushion system driving circuit 178, the seat back system driving circuit 180, and the seat belt system driving circuit 182 are provided at the passenger seat 24. These circuits 178, 180 and 182 are basically structured in the same manner as the cushion system driving circuit 170, the seat back system driving circuit 174, and the seat belt system driving circuit 176, respectively and the detailed explanation thereof will be omitted.

As shown in FIG. 5, the control circuit 88 is also electrically connected to the roof ECU 210 via the bus 90. The roof ECU 210 is connected to a sun roof driving circuit 212, a right-hand front map lamp control circuit 214, a left-hand front map lamp control circuit 216, a right-hand rear map lamp control circuit 218, a left-hand rear map lamp control circuit 220, and a luggage room lamp control circuit 222.

Figure 12:
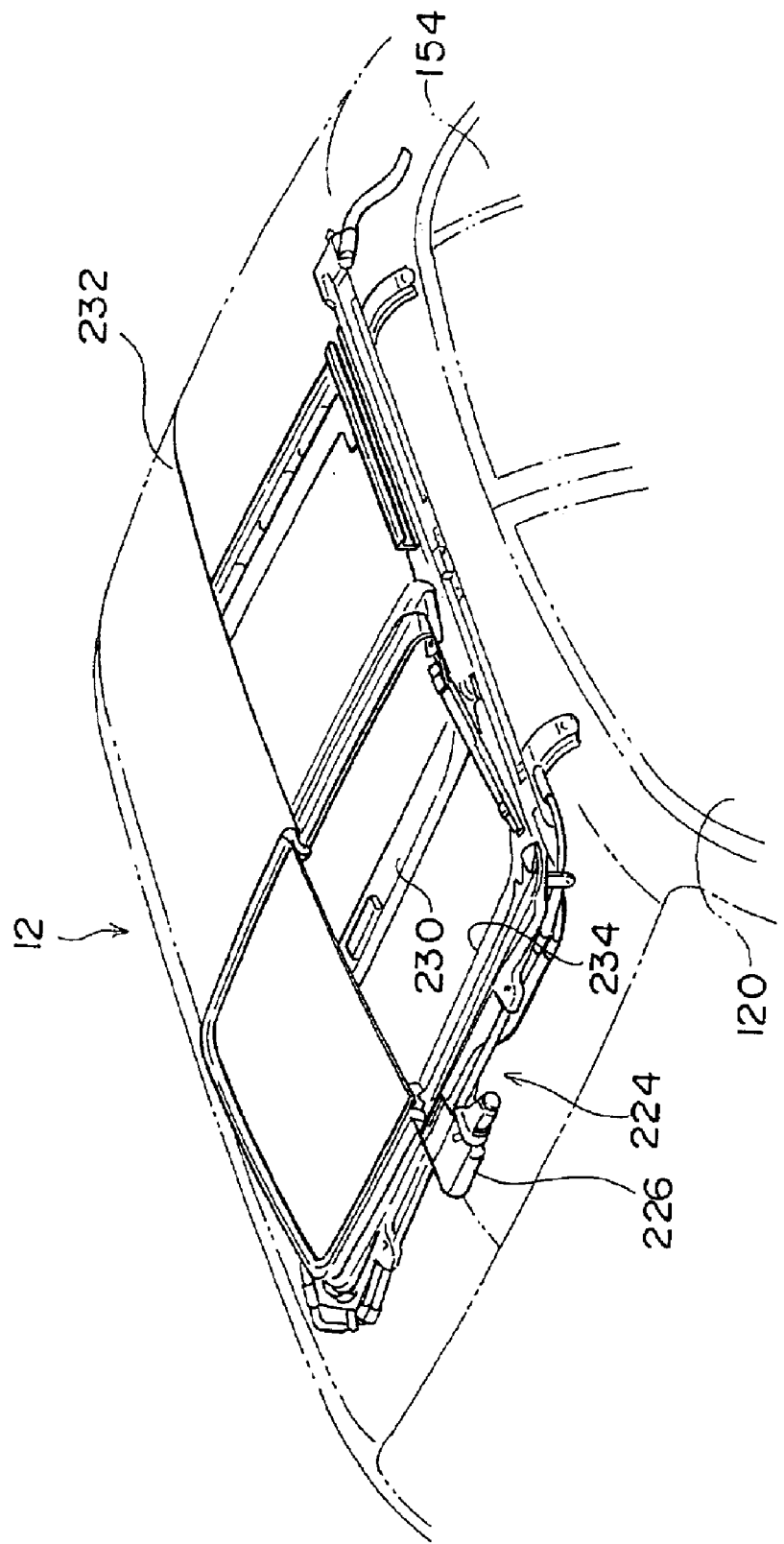
FIG. 12 is a perspective view schematically illustrating a sun roof device.

The sun roof driving circuit 212 is connected to a sliding roof motor 226 to control the same. The sliding roof motor 226 is a driving section which is included in a sun roof device 224 shown in FIG. 12. The sliding roof motor 226 is mechanically connected to a sliding roof 230, which is a driven part shown in FIG. 12, via a connecting part such as a drive cable. The sliding roof motor 226 drives the sliding roof 230 to be slid in the substantially longitudinal direction of the vehicle to open and close a substantially rectangular opening 234 formed in a roof panel 232.

The right-hand front map lamp control circuit 214 and the left-hand front map lamp control circuit 216 are electrically connected to a map lamp 238 shown in FIG. 4. A pair of bulbs (not shown) are provided inside the map lamp 238 such that they are disposed at each end of the map lamp 238 in the vehicle transverse direction. The right-hand front map lamp control circuit 214 turns the right-hand bulb on and off and the left-hand front map lamp control circuit 216 turns the left-hand bulb on and off.

A right-hand rear map lamp 242 is provided at an upper right portion of a rear seat 240 shown in FIGS. 8 and 11. The right-hand rear map lamp control circuit 218 is electrically connected to the right-hand rear map lamp 242 to turn the bulb in the lamp on and off. A left-hand rear map lamp (not shown) is provided at an upper left portion of a rear seat 240. The left-hand rear map lamp control circuit 220 is electrically connected to the left-hand rear map lamp 240 to turn the bulb in the lamp on and off. A luggage room lamp control circuit 222 is electrically connected to a luggage room lamp provided inside a luggage room (both of which are not shown) to turn the bulb in the lamp on and off.

The control circuit 88 is also electrically connected, via the bus 90, to an audio ECU 244 for controlling an audio system, an air conditioner ECU 246 for controlling an air conditioner, an automobile navigation system ECU 248 for controlling an automobile navigation system, and an electronic toll collection (ETC) ECU 250 for controlling an ETC, which are installed in the vehicle.

As described above, since the control circuit 88 is connected to each of the ECUs 92 to 250, the control circuit 88 sends operation signals and later-described motion confirmation signals to each of the ECUs 92 to 250 in accordance with signals fed by the key 44 or the switches 40, 42 on the grip 32. The control circuit 88, however, sends an operation signal only to any one of ECUs 92 to 250 in accordance with the energized state of the switches 52 to 58 and 62 to 84. The table in FIG. 6 shows the relationships between the energized state of the switches 52 to 58, 62 to 84 and the ECUs 92 to 250 which receive the operation signal. As shown, the control circuit 88 sends an operation signal to the roof ECU 210 as a driving control signal for the sun roof driving circuit 212 when, for example, the switches 52 and 62 are energized. When the switches 56 and 64 are energized, the control circuit 88 sends an operation signal to the roof ECU 210 as a driving control signal for the mirror driving circuit 100.

Operation and effect of the present embodiment will be described hereinafter.

In the multi access switch 10, the movable body 86 rotates integrally with the rotating section 16 when the rotating section 16 is turned about the shaft 20 relative to the support 28. When the rotating section 16 is turned until the mark 46 points the substantially forward of the vehicle, the movable body 86 faces the switch 62 along the rotational radial direction of the rotating section 16, whereby the movable body 86 is detected and the switch 62 is conducted.

By pivoting the grip 32 about the shaft 34 relative to the rotating section 16, the movable body 60 is rotated integrally with the grip 32. When the grip 32 is pivoted until the mark 46 points the substantially most upward direction of the vehicle, the movable body 60 faces the switch 52 along the pivotal radial direction of the grip 32, whereby the movable body 60 is detected and the switch 52 is conducted.

Upon detecting that the switches 52 and 62 are conducted, the control circuit 88 which is connected to the switches 52 to 58 and 62 to 84 sends a motion confirmation signal to the roof ECU 210. Upon receiving the motion confirmation signal from the control circuit 88, the roof ECU 210 determines the sliding position of the sliding roof 230 in accordance with a signal from a sliding roof detector or a signal from a motor rotational position detector (not shown). The sliding roof detector detects the sliding position of the sliding roof 230 and the motor rotational position detector detects the rotational position of the sliding roof motor 226.

Figure 13A:
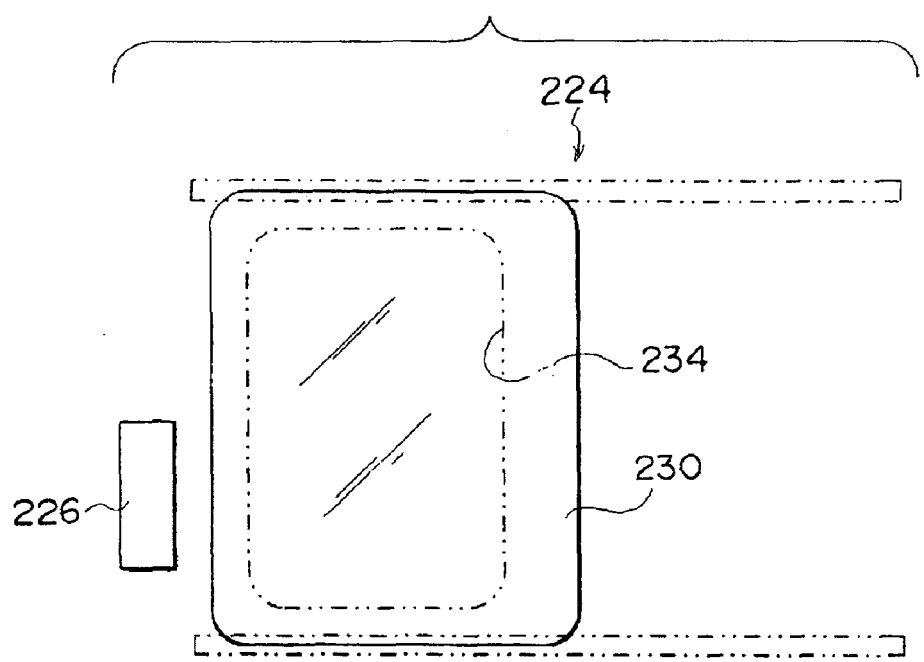
FIGS. 13A and 13B are conceptual diagrams of a sun roof device.
Figure 13B:
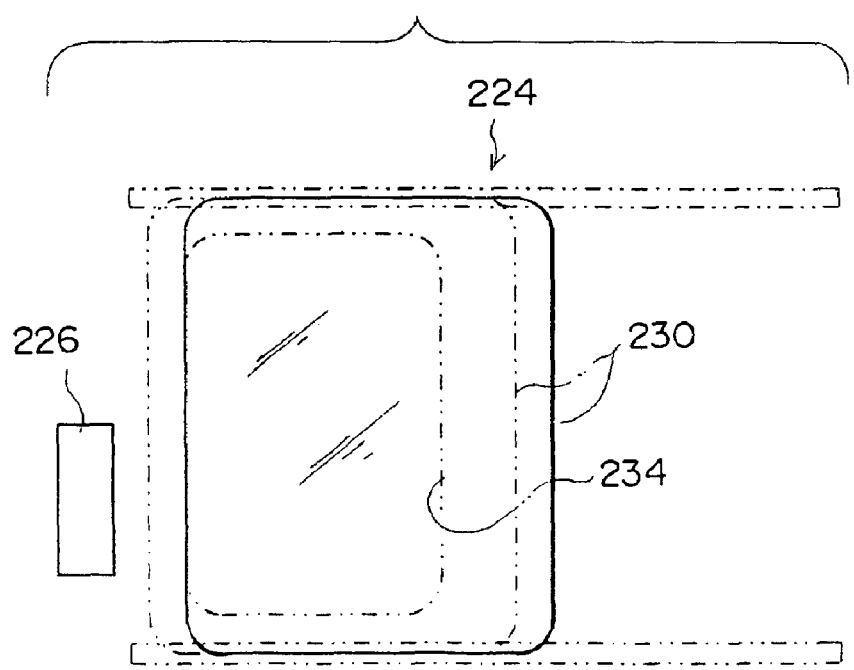

FIGS. 13A and 13B are conceptual diagrams of a sun roof device. As shown in FIG. 13A, when the opening 234 of the roof panel 232 is fully closed by the sliding roof 230, the roof ECU 210 drives the sliding roof motor 226 via the sun roof driving circuit 212 so that the sliding roof 230 is slid substantially backward of the vehicle slightly (i.e., in an amount that is enough for the vehicle occupant to visually confirm the sliding motion of the roof 230) as shown in FIG. 13B.

After the sliding roof 230 is slid by a predetermined amount, the roof ECU 210 drives the sliding roof motor 226 in the reverse direction via the sun roof driving circuit 212, whereby the opening 234 of the roof panel 232 is fully closed again by the sliding roof 230 as shown in FIG. 13A.

Figure 14A:
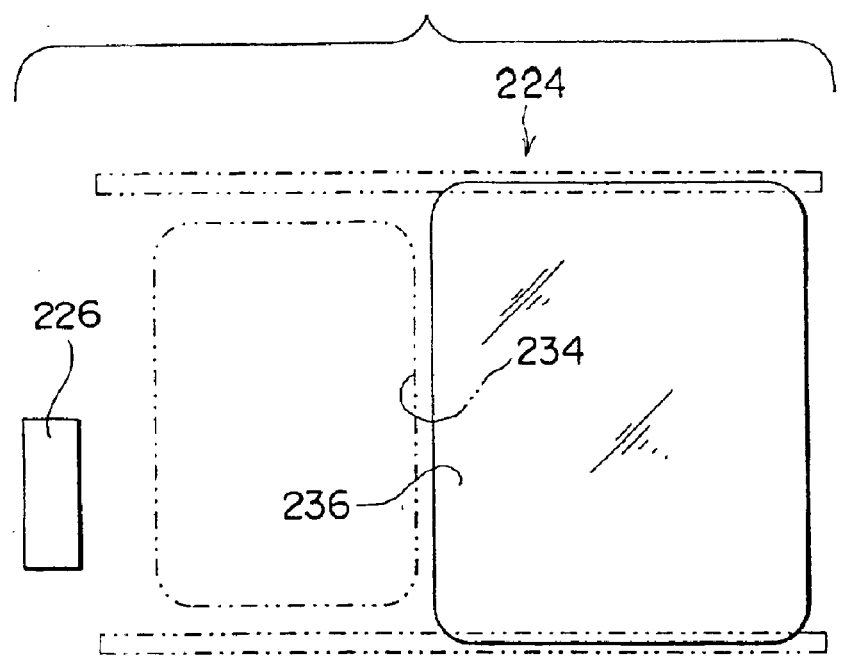
FIGS. 14A and 14B are conceptual diagrams of the sun roof device.
Figure 14B:
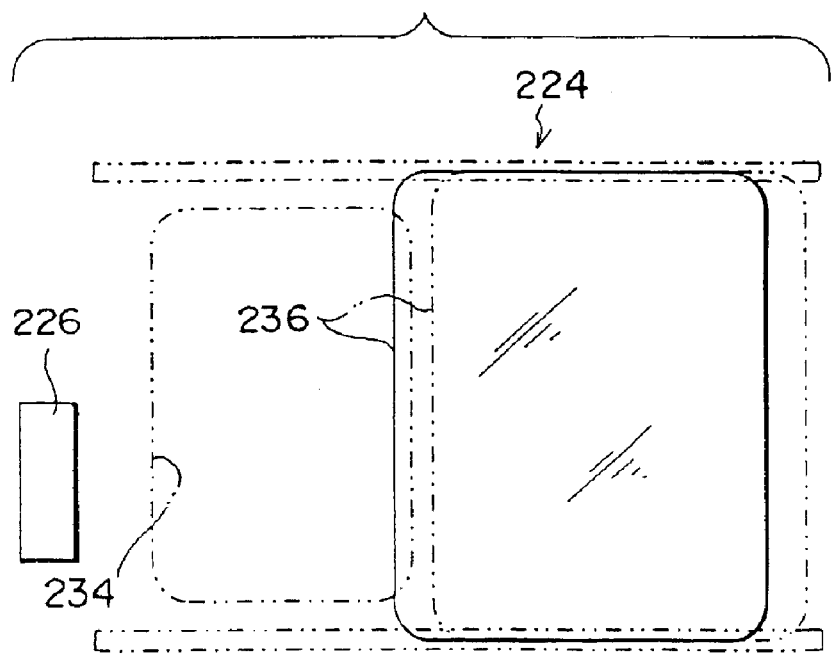

FIGS. 14A and 14B are conceptual diagrams of the sun roof device. As shown in FIG. 14A, when the opening 234 of the roof panel 232 is fully opened by the sliding roof 230, the roof ECU 210 drives the sliding roof motor 226 via the sun roof driving circuit 212 so that the sliding roof 230 is slid substantially forward of the vehicle slightly (i.e., in an amount that is enough for the vehicle occupant to visually confirm the sliding motion of the roof 230) as shown in FIG. 14B.

After the sliding roof 230 is slid by a predetermined amount, the roof ECU 210 drives the sliding roof motor 226 in the reverse direction via the sun roof driving circuit 212, whereby the opening 234 of the roof panel 232 is fully opened again by the sliding roof 230 as shown in FIG. 14A.

In the present embodiment, the vehicle occupant can thus confirm that the sliding roof motor 226 has become controllable with the switch 40, 42 or the like by looking the slight reciprocation of the sliding roof 230, and it is unnecessary to look the turned position of the grip 32 about the shaft 20 or the pivoted position of the grip 32 about the shaft 34. This arrangement requires no special confirming section such as an indicator, and is feasible in a lower cost because the occupant can confirm whether the sliding roof motor 226 becomes able to be controlled or not by looking the sliding reciprocation of the sliding roof 230.

By pressing, for example, the switch 40 after the reciprocation of the sliding roof 230 in accordance with a motion confirmation signal is completed, an operation signal is sent to the roof ECU 210 via the control circuit 88. The sliding roof 230 which is fully closing the opening 234 is thereby slid substantially backward of the vehicle to open the opening 234.

When the rotating section 16 is turned until the mark 46 points in a direction which is tilted by 30 degrees to the right with respect to the substantially forward direction of the vehicle, the movable body 86 faces the switch 64 along the rotational radial direction of the rotating section 16, whereby the movable body 86 is detected and the switch 64 is conducted.

Further, when the grip 32 is pivoted until the mark 46 is set to be substantially horizontal and points the substantially forward of the vehicle, the movable body 60 faces the switch 56 along the pivotal radial direction of the grip 32, whereby the movable body 60 is detected and the switch 56 is conducted.

Figure 15A:
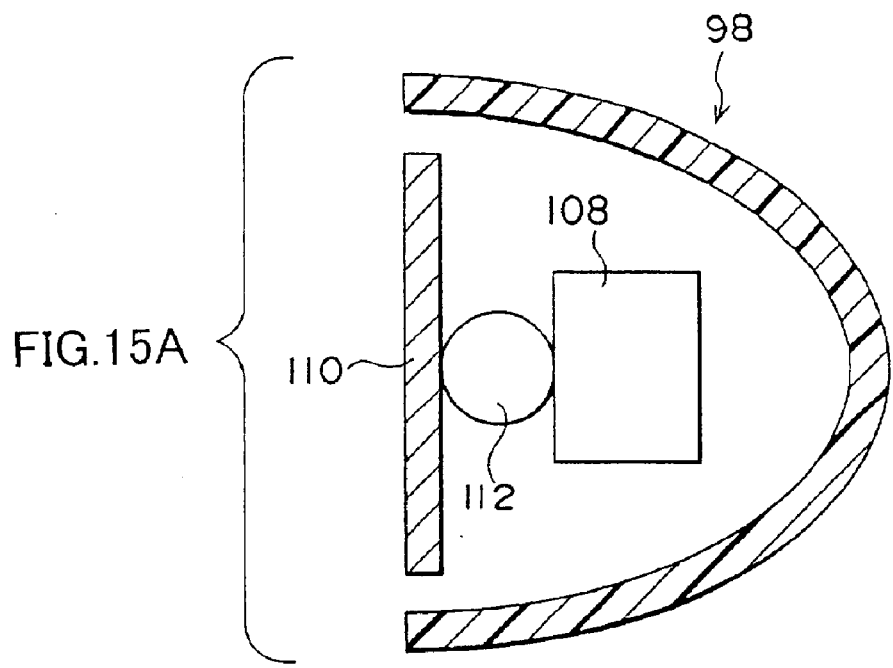
FIGS. 15A and 15B are conceptual diagrams of a door mirror.
Figure 15B:
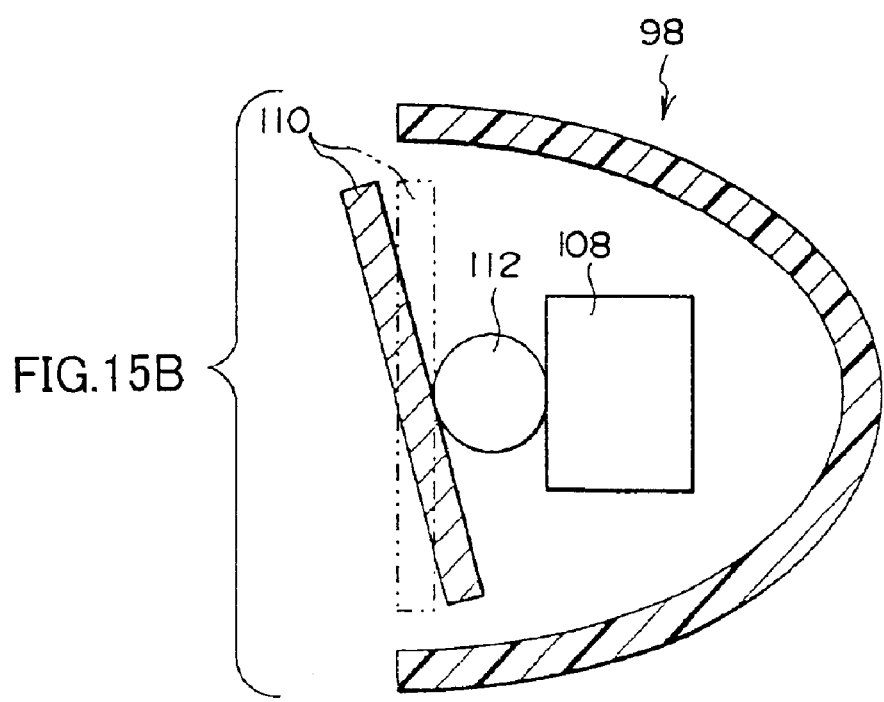

Upon detecting that the switches 56 and 64 are energized, the control circuit 88 sends a motion confirmation signal to the right-hand front door ECU 92. Upon receiving the motion confirmation signal from the control circuit 88, the right-hand front door ECU 92 drives the mirror driving motor 108 via the mirror driving circuit 100 so that the mirror body 110 pivots slightly (i.e., in an amount that is enough for the vehicle occupant to visually confirm the pivotal motion of the mirror body 110) to have the reflective surface of the mirror body 110 to slightly face down. After the mirror body 110 is pivoted in a predetermined amount, the right-hand front door ECU 92 drives the mirror driving motor 108 in the reverse direction via the mirror driving circuit 100, whereby the mirror body 110 returns to the initial position again as shown in FIG. 15A.

In the present embodiment, the vehicle occupant can confirm that the mirror driving motor 108 has become controllable with the switch 40, 42 or the like by looking the slight reciprocation of the mirror body 110, and it is unnecessary to look the turned position of the grip 32 about the shaft 20 or the pivoted position of the grip 32 about the shaft 34. This arrangement requires no special confirming section such as an indicator, and is feasible in a lower cost because the occupant can confirm whether the mirror body 110 becomes able to be controlled or not by looking the sliding reciprocation of the mirror body 110.

By operating, for example, the key 44 after the reciprocation of the mirror body 110 in accordance with a motion confirmation signal is completed, the reflective surface of the mirror body 110 can be adjusted to a desired angle.

When the rotating section 16 is turned until the movable body 86 faces the switch 66 along the rotational radial direction of the rotating section 16 with the switch 56 and the movable body 60 remaining facing each other, the switch 66 detects the movable body 86 and the switch 66 is conducted.

Upon detecting that the switches 56 and 66 are conducted, the control circuit 88 sends a motion confirmation signal to the right-hand front door ECU 92. Upon receiving the motion confirmation signal from the control circuit 88, the right-hand front door ECU 92 determines the sliding position of the door glass 120 in accordance with a signal from a door glass detector or a signal from a motor rotational position detector (not shown). The door glass detector detects the position of the door glass 120 and the motor rotational position detector detects the rotational position of the driving motor 118 of the window regulator 116.

Figure 16A:
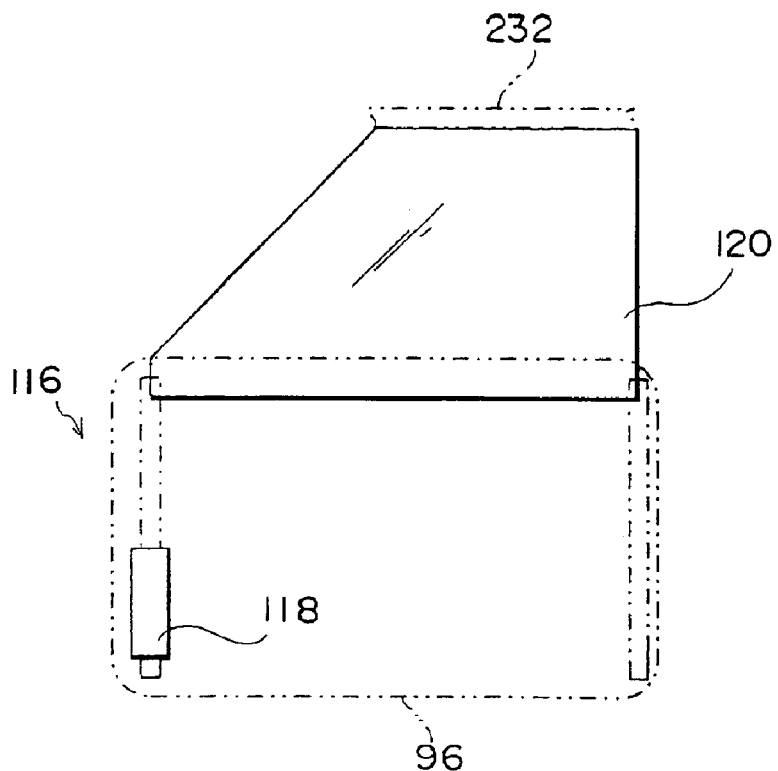
FIGS. 16A and 16B are conceptual diagrams of a window regulator.
Figure 16B:
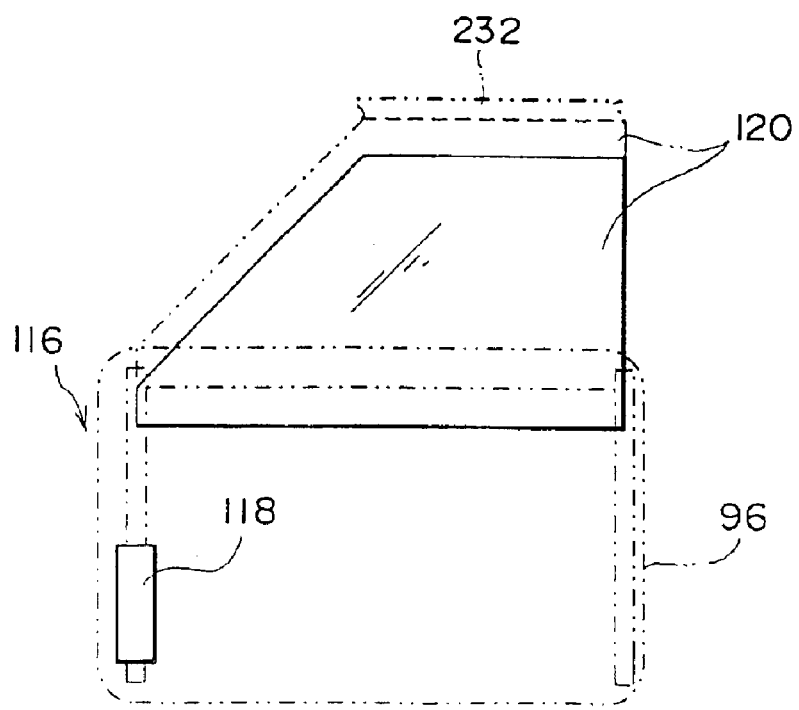

FIGS. 16A and 16B are conceptual diagrams of a window regulator. As shown in FIG. 16A, when the door glass 120 is in a fully closed state between the door panel 96 and the roof panel 232, the right-hand front door ECU 92 drives the window regulator 116 (driving motor 118) via the window regulator driving circuit 114 so that the door glass 120 is slid substantially down slightly (i.e., in an amount that is enough for the vehicle occupant to visually confirm the sliding motion of the door glass 120) as shown in FIG. 16B.

After the door glass 120 is slid in a predetermined amount, the right-hand front door ECU 92 drives the window regulator 116 (driving motor 118) in the reverse direction via the window regulator driving circuit 114, whereby the opening of the roof panel 232 is fully closed again by the door glass 120 as shown in FIG. 16A.

Figure 17A:
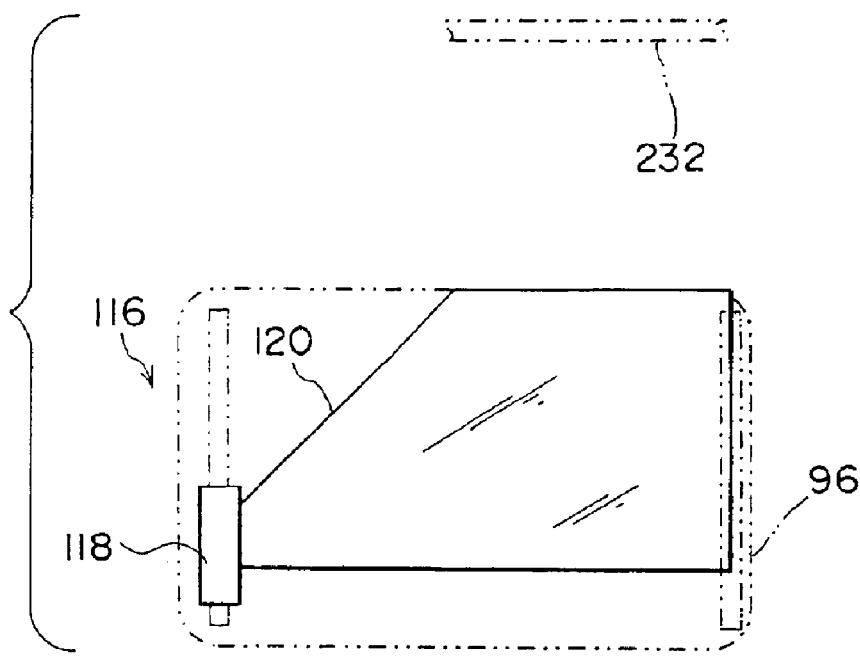
FIGS. 17A and 17B are conceptual diagrams of a window regulator.
Figure 17B:
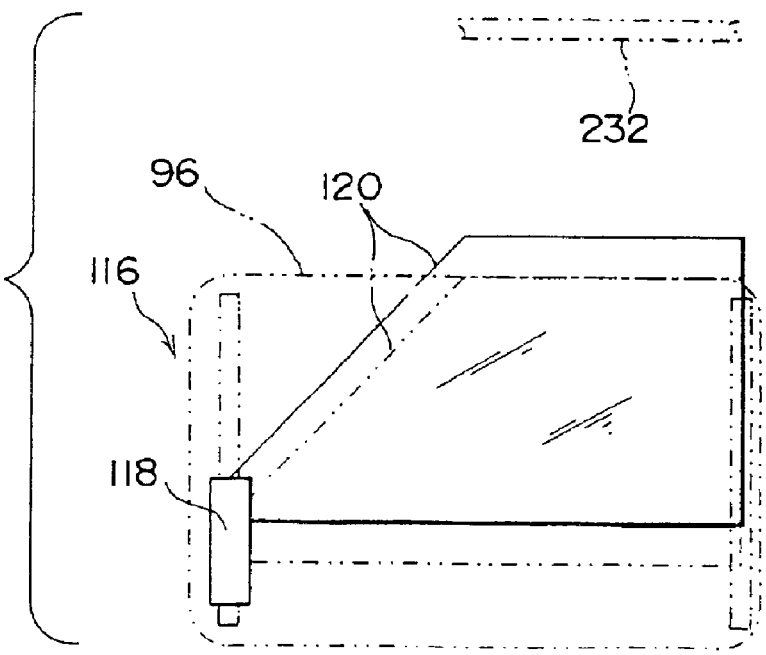

As shown FIG. 17A, when the opening of the roof panel 232 is fully opened by the door glass 120, the right-hand front door ECU 92 drives the window regulator 116 (driving motor 118) via the window regulator driving circuit 114 so that the door glass 120 is slid substantially up slightly (i.e., in an amount that is enough for the vehicle occupant to visually confirm the sliding motion of the door glass 120) as shown in FIG. 17B.

After the door glass 120 is slid in a predetermined amount, the right-hand front door ECU 92 drives the window regulator 116 (driving motor 118) in the reverse direction via the window regulator driving circuit 114, whereby the opening of the roof panel 232 is fully opened again by the door glass 120 as shown in FIG. 17A.

In the present embodiment, the vehicle occupant can confirm that the window regulator 116 has become controllable with the switch 40, 42 or the like by looking the slight reciprocation of the door glass 120, and it is unnecessary to look the turned position of the grip 32 about the shaft 20 or the pivoted position of the grip 32 about the shaft 34. This arrangement requires no special confirming section such as an indicator, and is feasible in a lower cost because of the structure in which whether or not the window regulator 116 has become controllable is confirmed by looking the slight reciprocation of the door glass 120.

By pressing, for example, the switch 40 after the reciprocation of the door glass 120 in accordance with a motion confirmation signal is completed, an operation signal is sent to the right-hand front door ECU 92 via the control circuit 88. The door glass 120 which is fully closing the opening is thereby slid substantially down to open the opening.

In the present embodiment, device to be operated or to be controlled by the key 44 or the switches 40, 42 is changed in accordance with the conduct state of the switches 52 to 58 and 62 to 84. This arrangement is feasible in a lower cost compared to an arrangement in which a controller 14 is provided for each device. Further, as shown in FIGS. 2, 3 and the table in FIG. 6, each of positions in which the switches 52 to 58 and 62 to 84 are arranged corresponds to respective devices each of which can be operatable when corresponding switch is conducted. That is, when one of the switches and the movable body are conducted, a direction of the mark 46 (grip 32) substantially corresponds to (coincides with) a position (direction) of the device which is to be able to be operated in the conduct state. Accordingly, when the mark 46 on the grip 32 is directed to a device to be operated, the device which is directed by the mark becomes operable. The vehicle occupant can therefore easily recognize the relationships between the turned position of the grip 32 about the shaft 20 or the pivoted position of the grip 32 about the shaft 34 and the device to be operated.

As described above, in a structure in which devices to be operated such as the door glass 120, 128, 144 or 154, the mirror body 110, the sliding roof 230 or the like is driven by the window regulator 116, 124, 140 or 150, the mirror driving motor 108, 118, 126 or 142, the sliding roof motor 226 or the like, the vehicle occupant can confirm which device is controllable by looking the slight reciprocation of the device, and it is unnecessary to look the grip 32 because the device to be operated performs the reciprocation movement that is enough for the vehicle occupant to observe due to that the motion confirmation signal is sent from the control circuit 88.

In the present embodiment, the window regulators 116, 124, 140 and 150, the door mirrors 98 and 104, and the sun roof system 224 which drive the devices that physically move, such as the door glasses 120 to 154, the mirror body 110, the sliding roof 230, and the like are regarded as the "devices" of the present invention. Equipment having no part which physically moves, however, can also be regarded as the "device" of the present invention. Examples of such equipment will be described in short below.

When, for example, predetermined switches of the switches 52 to 58 and 62 to 84 are conducted, the right-hand front map lamp control circuit may drive the corresponding bulb to blink momentarily in accordance with the motion confirmation signal from the control circuit 88, which allows the vehicle occupant to confirm that the right-hand bulb of the map lamp 238 has become controllable such that it can be turned on and turned off. In this case, the map lamp 238 is regarded as the "device" of the present invention.

Further, for example, when the predetermined switches of the switches 52 to 58 and 62 to 84 are conducted, the back light provided on a operation panel of the audio system blinks (flashes) momentarily via the motion confirmation signal from the control circuit 88, the audio system or the automobile navigation system may be momentarily turned on/off (or off/on), or the back light provided on a display panel of the audio system may blink momentarily by the motion confirmation signal, which allows the vehicle occupant to confirm that the audio system has become controllable. In this case, the audio system is regarded as the "device" of the present invention.

Accordingly, the device to be operated which is activated by the motion confirmation signal is not limited to ones that are moved by a driving force of a motor or the like. Any device which can make a reciprocation of a motion based on the typical (ordinary) motion thereof can be regarded as a device to be operated, as long as the vehicle occupant can confirm the reciprocation by his or her five senses. In the present invention, not only the reciprocation of physical movement, but also turning on/off of light, generating or reducing of sound are included in the "reciprocation."

Further, even if the device to be operated which is activated by the motion confirmation signal is driven by a driving force of a motor or the like, the vehicle occupant does not necessarily observe (look) the device.

Namely, the movement of the door glasses 120 to 154, the sliding roof 230, and the like can also be confirmed by operating sound (i.e., a rolling sound of a rolling body such as a roller, a frictional sound between a weather strip or the like, the operating sound of the motor, and the like) as well as confirmed by visually observing. When the vehicle occupant is seated on the driver's seat 22 in typical driving style, some of the devices, such as the door glasses 144, 154 or the sliding roof 230, and the like, may be out of his or her eyesight. With the above arrangement, however, the vehicle occupant can confirm the device by hearing the operation sound and thus needs not to change his or her driving style. Thus, the vehicle occupant is allowed to make a blind operation (an operation which needs no visual confirmation).

Similarly, when the steering wheel 164, seats such as the driver's seat 22, or the seat belt system 200 are ones to be operated, each corresponding motor (namely, the tilt adjusting motor 160, reclining motor 192, or the adjuster motor 206) is driven in forward and then in the reverse directions in an amount that is enough for the vehicle occupant to confirm that it is activated by tactile sensation, thereby making it unnecessary for the vehicle occupant to look the devices, such as the steering wheel 164, seats such as the driver's seat 22, or the seat belt system 200, to confirm directly.

Though the controller 14 and each device are physically connected in the present embodiment, the present invention can also be applied to a structure in which each of devices is not connected to the controller 14, namely, the devices are controlled by wireless communication using infrared ray or electric waves that are emitted from an operation section such as the controller 14.

Though the window regulators 116 to 150, the mirror driving motors 108 to 142, the audio system, the air conditioner, and the like are described herein as devices to be operated ("device" in the aspects), devices are not limited to the same. Instead, the present invention can be applied to any devices that can be operated by an operation section such as the controller 14. Further, note that, as shown in the table in FIG. 6, when there are some combinations of switches which do not correspond to any device (for example, the combination is, conducted switches 52 and 64), then, when an additional device to be operated is to be added to the present embodiment, such combinations may be applied to the additional device. In this manner, no major design change is necessary.

Although the grip 32 forming the operation section includes the key 44, and switches 40 and 42, the operation section of the present invention is not limited to the same. The operation section may be formed by two separate parts, such as a selecting section like the grip 32 for selecting the device to be operated (device) and a operation signal sending section like the key 44 and the switches 40, 42 for actually operating the device to be operated (device).

Further, although the present embodiment has been described as a device controller for various devices in the vehicle 12, the present invention is not limited to the same. Instead, the present invention can be widely applied to various application including domestic use.

In the present invention, the vehicle occupant can confirm the device that can be operated without looking (visually observing) the operation section.

What is claimed is:

1. A device controller, comprising:
    an operation section which is capable of sending an operation signal to a device for achieving an original functionality; and
    a controlling section for notification, at a point in time at which the device becomes able to receive the operation signal from the operation section, that the device has become able to receive the operation signal from the operation section by actuating a function that the device has for achieving the original functionality to thereby change an operational state of the device from a present condition to a condition that is different from the present condition of the device,
    wherein, immediately after the different condition is achieved, the controlling section completes the notification by changing the operational state of the device from the different condition to the present condition.

2. The device controller according to claim 1, wherein the operation section includes:
    an operation section main body that is displaceable within a predetermined range in a vehicle compartment, and
    detecting sections, with each detecting section being connected to the controlling section and detecting the operation section main body at different positions thereof within the predetermined range,
    the device is mounted in the vehicle, and
    when one detecting section detects the operation section main body, the operation section can send the operation signal to the device that corresponds to the detecting section, and
    a direction indicated by the operation section main body substantially corresponds to a position of the device corresponding to the detecting section.

3. A device controller, comprising:
    an operation section which is capable of sending an operation signal to a device, for achieving an original functionality, disposed at a position spaced apart from the operation section; and
    a controlling section which, at a point in time at which the controlling section becomes able to receive the operation signal from the operation section, changes an operational state of the device from an initial current condition to a condition that is different from the current condition of the device by actuating a function that the device has for achieving the original functionality, and immediately returns the device, after achieving the different condition, to the initial condition by again actuating the function of the device for achieving the original functionality, wherein the device further includes:

a driving section for displacing a driven part on the basis of the operation signal from the operation section, and at the point in time at which the controlling section becomes able to receive the operation signal from the operation section, the controlling section drives the driving section to displace the driven part in a predetermined direction by a predetermined amount, and, immediately after the driven part is displaced in the predetermined amount, drives the driving section to displace the driven part in a direction opposite to the predetermined direction by the predetermined amount.

4. The device controller according to claim 3, wherein the operation section includes:

an operation section main body that is displaceable within a predetermined range in a vehicle compartment, and detecting sections, with each detecting section being connected to the controlling section and detecting the operation section main body at different positions within the predetermined range, the device is mounted in the vehicle, and the operation section can send the operation signal to the device when the operation section man body is in a position corresponding to the device within the predetermined range.

5. A device controller, comprising:

an operation section which is capable of sending an operation signal to a device, for achieving an original functionality, disposed at a position spaced apart from the operation section; and a controlling section which, at a point in time at which the controlling section becomes able to receive the operation signal from the operation section, changes an operational state of the device from an initial current condition to a condition that is different from the initial current condition of the device by actuating a function that the device has for achieving the original functionality, and immediately returns the device, after achieving the different condition, to the initial current condition by again actuating the function of the device for achieving the original functionality.

6. The device controller according to claim 5, wherein the operation section includes:

an operation section main body that is displaceable within a predetermined range in a vehicle compartment, and detecting sections, with each detecting section being connected to the controlling section and detecting the operation section main body at different positions within the predetermined range, the device is mounted in the vehicle, and the operation section can send the operation signal to the device when the operation section main body is in a position corresponding to the device within the predetermined range.

* * * * *